(12) United States Patent
Ueda et al.

(10) Patent No.: US 6,977,474 B2
(45) Date of Patent: Dec. 20, 2005

(54) CONTROL SYSTEM FOR A LINEAR VIBRATION MOTOR

(75) Inventors: Mitsuo Ueda, Nishinomiya (JP); Hideki Nakata, Shijyonawate (JP); Makoto Yoshida, Kusatsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 67 days.

(21) Appl. No.: 10/483,720

(22) PCT Filed: Jul. 15, 2003

(86) PCT No.: PCT/JP03/08958

§ 371 (c)(1), (2), (4) Date: Jan. 14, 2004

(87) PCT Pub. No.: WO2004/008626

PCT Pub. Date: Jan. 22, 2004

(65) Prior Publication Data

US 2004/0169480 A1 Sep. 2, 2004

(30) Foreign Application Priority Data

Jul. 16, 2002 (JP) ......................... 2002-207467

(51) Int. Cl.[7] .......................... F04B 49/06; F04B 35/04; F25B 1/02; H02P 5/00

(52) U.S. Cl. ................... 318/128; 318/126; 417/417

(58) Field of Search .................. 318/119, 126–128, 318/135, 686; 310/12–15, 17, 36; 417/417

(56) References Cited

U.S. PATENT DOCUMENTS

| 4,101,816 | A | | 7/1978 | Shepter ........................ 318/130 |
| 5,955,799 | A | * | 9/1999 | Amaya et al. .................. 310/36 |
| 6,501,240 | B2 | | 12/2002 | Ueda et al. .................. 318/135 |
| 6,746,211 | B2 | * | 6/2004 | Kwon et al. ............... 417/44.11 |
| 2003/0026702 | A1 | * | 2/2003 | Yoo et al. | |

FOREIGN PATENT DOCUMENTS

| EP | 0 860 933 | 8/1998 | .......... H02K/33/16 |
| GB | 2 008 809 | 6/1979 | .......... G05D/19/02 |
| JP | 2-126975 | 5/1990 | .............. B06B/1/04 |
| JP | 11-324911 | 11/1999 | ........... F04B/35/04 |
| JP | 2001-193993 | 7/2001 | ............ F24F/11/02 |
| JP | 2002-13484 | 1/2002 | ........... F04B/49/06 |
| JP | 2002-155868 | 5/2002 | ........... F04B/49/06 |
| JP | 2003-56470 | 2/2003 | ........... F04B/49/06 |

OTHER PUBLICATIONS

Patent Abstracts of Japan, vol. 014, No. 350 (C–0744), Jul. 27, 1990 & JP 02 126975 A (Shinko Electric Co., LTD.), May 15, 1990.

L. Knox et al., "Design of a Flight Qualified Long–Life Cryocoller", Proceedings of The Cryocooler Conference, Boulder, Sep 17–18, 1984, Boulder, NBS, U.S., vol. CONF. 3, Sep. 17, 1984, pp. 99–118, XP000210355, pp. 115–116.

Patent Abstracts of Japan, vol. 2000, No. 2, Feb. 29, 2000 & JP 11 324911 A (Sanyo Electric Co., LTD.), Nov. 26, 1999.

L. Knox et al., "Design of a Flight Qualified Long–Life Cryocooler" Proceedings of the Cryocooler Conference, Boulder, Sep. 17–18, 1984, Boulder, NBS, US, vol. Conf. 3, Sep. 17, 1984, pp. 99–118.

* cited by examiner

Primary Examiner—Thanh Lam
Assistant Examiner—Judson H. Jones
(74) Attorney, Agent, or Firm—Wenderoth, Lind & Ponack, L.L.P.

(57) ABSTRACT

A motor driving apparatus for driving a linear vibration motor includes an order output determining unit for determining a motor output which is required of the linear vibration motor, and a driving frequency determining unit for determining a driving frequency of the linear vibration motor based on the determined motor output. An amplitude-fixed AC voltage having a frequency which is equal to the determined driving frequency is applied to the linear vibration motor, whereby the output of the linear vibration motor can be controlled without changing the amplitude value of the driving voltage which is applied to the linear vibration motor.

25 Claims, 12 Drawing Sheets

Fig.4 (a)

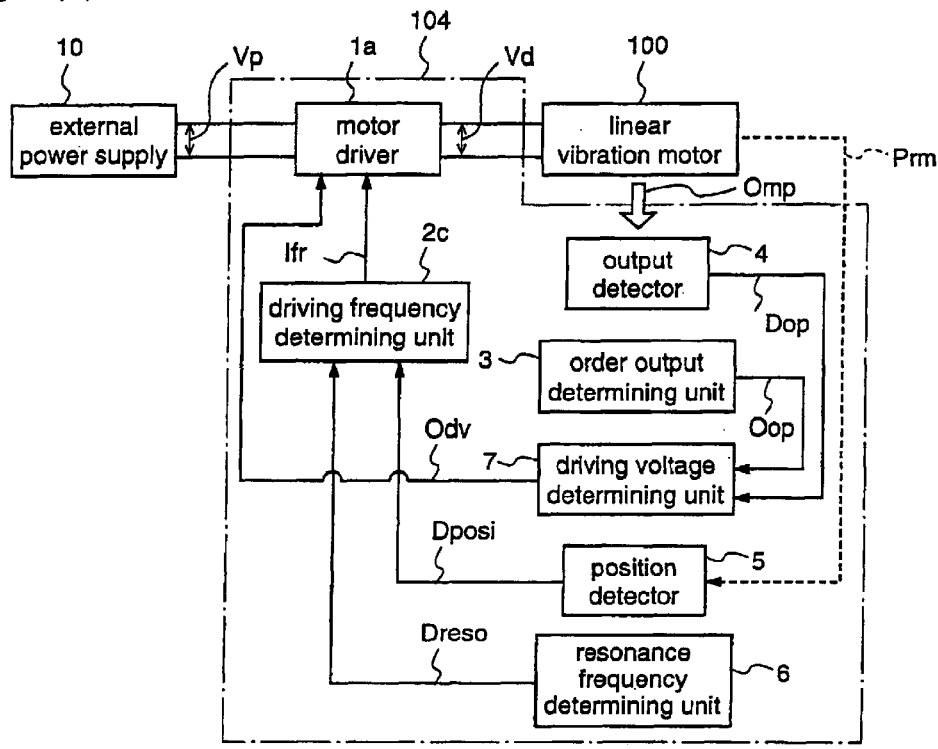

Fig.4 (b)

|  | allowable stroke state | over stroke state |  |
|---|---|---|---|
| The detected output is smaller than the required motor output. | The amplitude value of AC voltage Vd is increased. | The amplitude value of AC voltage Vd is adjusted so that the position of mover is within predetermined range. | DS3 |
| The detected output is larger than the required motor output. | The amplitude value of AC voltage Vd is decreased. | The amplitude value of AC voltage Vd is decreased. | DS4 |

DS1  DS2

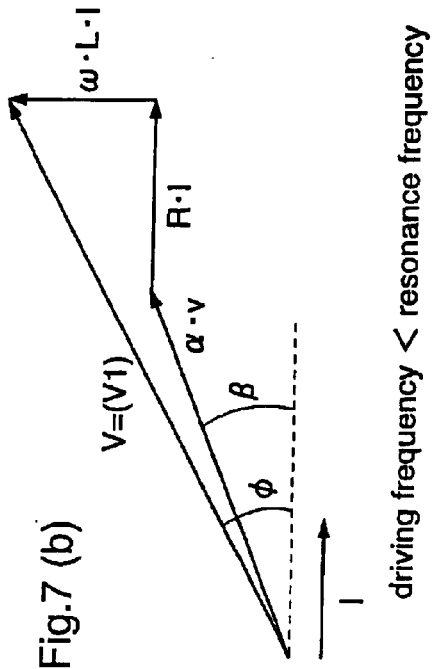
Fig.7 (a) — driving frequency = resonance frequency
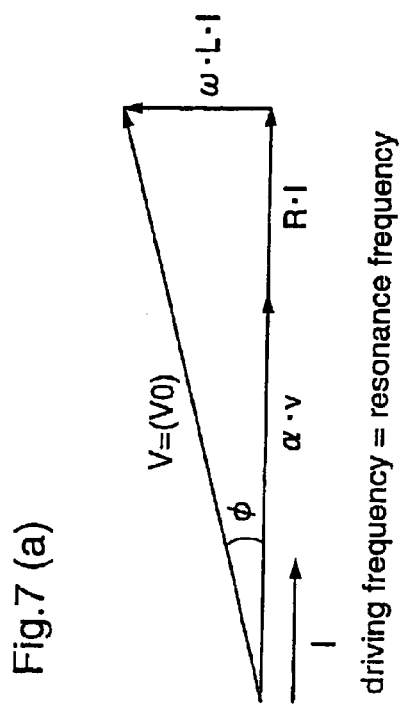
Fig.7 (b) — driving frequency < resonance frequency
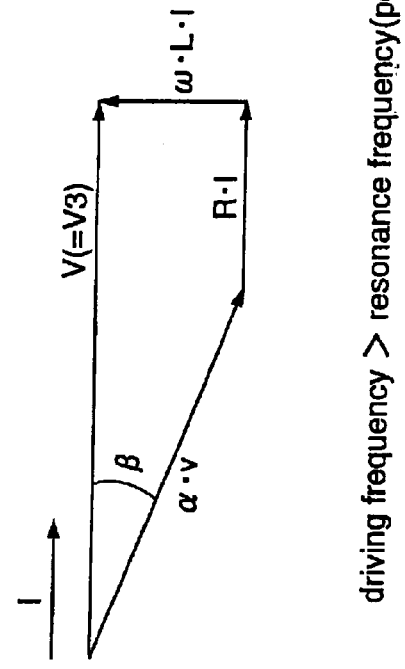
Fig.7 (c) — driving frequency > resonance frequency
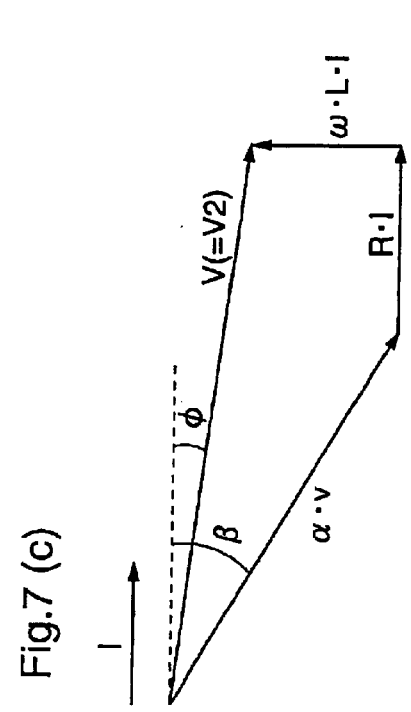
Fig.7 (d) — driving frequency > resonance frequency (power factor = 1)

CONTROL SYSTEM FOR A LINEAR VIBRATION MOTOR

TECHNICAL FIELD

The present invention relates to motor driving apparatuses and, more particularly, to a motor driving apparatus for driving a linear vibration motor having a mover and a spring member for supporting the mover.

BACKGROUND ART

Conventional equipment using linear vibration motors include vibration generators for informing of incoming calls by mechanical vibration, handy phones including such vibration generators, compressors for compressing and circulating gases or fluids, and reciprocating electric razors. The compressors and electric razors use the linear vibration motors as their driving sources.

A typical linear vibration motor has a structure of a single-phase sync motor. That is, the typical linear vibration motor it has a mover comprising a permanent magnet and a stator which is obtained by winding a coil around an iron core, and the mover reciprocates when an AC voltage is applied to the coil.

As described above, when generating vibration by a reciprocating motion of the mover, a strong electromagnetic force is needed. However, the energy that is required for driving the linear vibration motor can be minimized by forming a spring vibration system which includes the mover and a spring member supporting the mover. That is, in the linear vibration motor in which the mover is supported by the spring member, the spring vibration system including the mover is vibrated at its natural resonance frequency, whereby the linear vibration motor can be driven with a relatively low energy.

As a method for controlling an output of the linear vibration motor in which the mover is supported by the spring member, the amplitude value of a voltage or current which is supplied to the linear vibration motor may be adjusted while driving the linear vibration motor with its resonance frequency (for example, refer to Japanese Published Patent Application No. 2001-193993).

In the linear vibration motor, however, when the stroke length of the mover becomes larger than a predetermined allowable value, a problem such as a collision between the mover and the motor body or a breakage of the support spring may occur. Therefore, the stroke length of the mover is restricted by the structure of the linear vibration motor.

For example, when the extension of the support spring exceeds a predetermined value due to an increase in the stroke length of the mover, the support spring may plastically deform and break. Further, when the stroke length of the mover is increased to about the size of the motor body in the mover vibrating direction, the mover may collide against the inner wall of the motor body and break.

Accordingly an apparatus has been proposed for driving a linear vibration motor which solves the above-mentioned problems. This linear vibration motor driving apparatus is provided with a detector such as a position sensor for detecting the position of the mover of the linear vibration motor, and reduces the output of the linear vibration motor when the stroke length of the mover exceeds a predetermined allowable value, that is, decreases the amplitude value of the voltage or current applied to the linear vibration motor, thereby preventing the linear vibration motor from being destroyed due to a collision between the mover and the motor body or extension of the support spring over a critical value (for example, refer to Japanese Published Patent Application No. Hei.11-324911).

However, since the conventional linear vibration motor driving apparatus (hereinafter also referred to as a motor driving apparatus) drives the linear vibration motor with the frequency of the reciprocating motion being maintained at the resonance frequency of the spring vibration system including the mover, adjustment of the output of the linear vibration motor is carried out by only the stroke length of the mover. As a result, the maximum output of the linear vibration motor is undesirably restricted by the structure of the linear vibration motor, and further, the maximum output of the linear vibration motor is undesirably restricted by the power supply voltage which is applied to the motor driving apparatus.

The restriction on the motor output by the structure of the linear vibration motor will first be described in detail.

In the linear vibration motor, the maximum stroke length of the mover can be increased up to only the shorter one between the length of the body of the linear vibration motor containing the mover in the mover vibration direction, and the length corresponding to the elastic limit of the mover supporting spring.

Accordingly, in order to increase the maximum output of the linear vibration motor, the size of the motor body in the mover vibrating direction should be increased so as to secure a larger stroke length of the mover and, further, a spring having a larger elastic limit length should be used as the mover supporting spring. Alternatively, the spring constant of the mover supporting spring should be increased so as to increase the resonance frequency of the linear vibration motor.

Accordingly, in the conventional linear vibration motor, the mechanical construction is determined based on the required maximum output, and therefore, an increase in the maximum output may lead to not only an increase in size but also a reduction in motor efficiency in an output region of the highest frequency of use, i.e., a reduction in the ratio of the motor output to the motor input.

The above-mentioned problem will be specifically described taking, as an example, a case where the linear vibration motor is applied to a compressor of an air conditioner. In this case, an output region of the highest frequency of use is not a high output region where a high motor output is generated for rapid heating operation or rapid cooling operation but a low output region where the motor output is about 10–20% of the motor output in the high output region. In the low output region, since the stroke length of the mover is reduced, the motor efficiency is reduced. Further, in the compressor, the top clearance is extended due to a reduction in the stroke length of a piston, leading to a reduction in work efficiency.

The restriction on the motor output by the power supply voltage of the linear vibration motor will now be described in detail.

In the conventional motor driving apparatus described above, the value of the applied voltage is adjusted by intermittently applying the driving voltage to the linear vibration motor so that the mover has a desired stroke length. To be specific, when the output power that is required of the linear vibration motor is increased, the value of the voltage which is applied to the linear vibration motor is increased so as to increase the stroke length of the mover.

However, when a general inverter is used for the motor driving apparatus, the motor driving apparatus cannot output an AC voltage whose amplitude value is larger than the voltage level of an inputted DC voltage. In other words, even when the amplitude value of the driving voltage which is applied to the linear vibration motor is increased so as to increase the stroke length of the mover, the motor driving apparatus can apply, to the linear vibration motor, only an AC voltage whose amplitude value is equal to or lower than the voltage level of the input voltage. As a result, the maximum output of the linear vibration motor is restricted by the voltage level of the DC voltage which is applied to the motor driving apparatus.

In this case, in order to increase the maximum output of the linear vibration motor, there is no choice but to reduce the number of windings of the coil which is a component of the stator of the linear vibration motor. That is, by reducing the number of windings of the coil, the magnitude of an induced voltage that is generated by the linear vibration motor is changed, whereby the balance between the driving voltage and the driving current, i.e., the driving power that is a product of the driving current and the driving voltage, is changed.

Accordingly, in the conventional linear vibration motor, the number of windings of the coil as a component of the stator of the linear vibration motor is determined based on the required maximum output, thereby leading to a possibility that the motor efficiency might be reduced in the output region of the highest frequency of use.

For example, when the number of windings of the motor coil is reduced to increase the maximum output of the linear driving motor, the amount of current in the output region of the highest frequency of use, i.e., in the output region where the motor output power is low, is increased, thereby resulting in a reduction in motor efficiency due to an increase in copper loss or core loss in the motor, or an increase in loss in the inverter.

The present invention is made to solve the above-described problems. Accordingly, an object of the present invention is to provide a motor driving apparatus which can control the motor output in the state where the voltage level of the driving voltage of the linear vibration motor is kept constant, thereby to facilitate output control for the linear vibration motor, and which can increase the maximum output of the linear vibration motor without modifying the specifications of the linear vibration motor or the power supply thereof.

SUMMARY OF THE INVENTION

According to a first aspect of the present invention, there is provided a motor driving apparatus for driving a linear vibration motor having a mover which is reciprocatably provided, and a spring member which supports the mover. The motor driving apparatus also includes a motor driver for supplying an AC voltage as a driving voltage to the linear vibration motor, which motor driver controls at least one of a motor output of the linear vibration motor and a stroke of the mover by adjusting a frequency of the AC voltage. Therefore, the motor output can be adjusted with the driving voltage of the linear vibration motor being kept constant, whereby the maximum output of the linear vibration motor can be increased without modifying the specifications of the linear vibration motor or the power supply thereof.

Further, since the output of the linear vibration motor or the stroke of the mover is changed by adjusting the frequency of the AC voltage, output control for the linear vibration motor or stroke control for the mover can be easily carried out using a voltage-controlled oscillator or the like as an oscillator incorporated in the motor driver, by changing a control voltage for the voltage-controlled oscillator.

According to a second aspect of the present invention, the motor driving apparatus of the first aspect further includes a target output determining unit for determining a target output as a motor output required of the linear vibration motor, and a driving frequency determining unit for determining a driving frequency of the linear vibration motor on the basis of the determined target output. Further, the motor driver controls the motor output by adjusting the frequency of the AC voltage which is supplied to the linear vibration motor so as to be equal to the driving frequency that is determined by the driving frequency determining unit. Therefore, the output of the linear vibration motor can be brought to the target output without considerably changing the amplitude level of the AC voltage which is supplied to the linear vibration motor.

According to a third aspect of the present invention, the motor driving apparatus of the second aspect further includes an output detection unit for detecting the motor output of the linear vibration motor, and the driving frequency determining unit determines the driving frequency so that a difference between the detected motor output and the determined target output becomes zero. Therefore, output control for the linear vibration motor becomes a feedback control in which the motor output which is required of the linear vibration motor is the target output, whereby output control for the linear vibration motor or stroke control for the mover can be performed with stability and accuracy.

According to a fourth aspect of the present invention, the motor driving apparatus of the first aspect according to claim I further includes a driving frequency determining unit for determining a driving frequency of the linear vibration motor, and a position detection unit for detecting a position of the mover. Further, the driving frequency determining unit sets the driving frequency at a resonance frequency which brings a spring vibration system including the mover into a resonance state when the detected position of the mover does not exceed a predetermined reference position, and sets the driving frequency at a frequency which is higher than the resonance frequency when the detected position of the mover exceeds the reference position. Moreover, the motor driver controls the stroke of the mover by adjusting the frequency of the AC voltage which is supplied to the linear vibration motor so as to be equal to the driving frequency that is determined by the driving frequency determining unit. Therefore, under the state where the stroke of the mover is within an allowable range, the linear vibration motor can be driven at high efficiency by setting the driving efficiency at the resonance efficiency. Moreover, even in a high output region where the stroke of the mover might exceed the allowable range if the linear vibration motor is driven at the resonance frequency, the linear motor can be driven with the stroke of the mover being restricted to the allowable range.

According to a fifth aspect of the present invention, in accordance with the motor driving apparatus of the fourth aspect, the driving frequency determining unit changes the driving frequency to a frequency at which the detected position of the mover does not exceed the reference position when the detected position of the mover exceeds the reference position. Therefore, in a high output region where the stroke of the mover might exceed an allowable range if the linear vibration motor is driven at the resonance frequency, the driving frequency is set at a frequency, which is closest to the resonance frequency, at which the stroke of the mover does not exceed the allowable range. As a result, the linear vibration motor can be driven at maximum efficiency while preventing a collision of the mover or extension of the support spring over its elastic limit. Furthermore, since, in the high output region, the driving frequency is set at a frequency which is closest to the resonance frequency, at which the stroke of the mover does not exceed the allowable range, when the motor output which is required of the linear vibration motor is decreased, the driving frequency can be smoothly returned to the resonance frequency.

According to a sixth aspect of the present invention, the motor driving apparatus of the fourth aspect further includes a target output determining unit for determining a target output as a motor output which is required of the linear vibration motor, an output detection unit for detecting the motor output of the linear vibration motor, and a driving voltage determining unit for determining a target voltage value of the driving voltage of the linear vibration motor so that a difference between the detected motor output and the determined target output becomes zero. Further, the motor driver adjusts the frequency and voltage value of the AC voltage which is supplied to the linear vibration motor so that the voltage value of the AC voltage becomes equal to the target voltage value that is determined by the driving voltage determining unit, and the frequency of the AC voltage becomes equal to the driving frequency that is determined by the driving frequency determining unit. Therefore, output control for the linear vibration motor becomes a feedback control in which the voltage value of the driving voltage is adjusted with the motor output which is required of the linear vibration motor being the target output. As a result, output control for the linear vibration motor can be carried out with high accuracy, stability, and responsivity, while keeping the stroke of the mover within an allowable range.

According to a seventh aspect of the present invention, in accordance with the motor driving apparatus of any one of the fourth through sixth aspects, the reference position is determined based on an elastic limit value of the spring member supporting the mover. Therefore, even when a high motor output is required, the required motor output can be generated while suppressing the stroke length of the mover to an extent such that the extension of the support spring of the mover does not exceed the elastic limit value. As a result, the reliability of the linear vibration motor can be enhanced, and the linear vibration motor can be driven even in a high output region where driving of the linear vibration motor at the resonance frequency is impossible due to the elastic limit of extension of the support spring.

According to an eighth aspect of the present invention, in accordance with the motor driving apparatus of any one of the fourth through sixth aspects, the reference position is determined based on a position in which the mover might collide with parts constituting the linear vibration motor, or a position in which the mover might collide with parts of a device containing the linear vibration motor. Therefore, even when a high motor output is required, the required motor output can be generated by suppressing the stroke length of the mover to an extent such that the mover does not collide with the parts of the linear vibration motor or the parts of equipment in which the linear vibration motor is incorporated. As a result, the reliability of the linear vibration motor can be enhanced, and the linear vibration motor can be driven even in a high output region where driving of the linear vibration motor at the resonance frequency is impossible due to the size of the motor body in the mover vibrating direction.

According to a ninth aspect of the present invention, the motor driving apparatus of the first aspect further includes a driving frequency determining unit for determining a driving frequency of the linear vibration motor, a target output determining unit for determining a target output as a motor output which is required of the linear vibration motor; an output detection unit for detecting the motor output of the linear vibration motor, and a driving voltage determining unit for determining a target voltage value of the driving voltage of the linear vibration motor, so that a difference between the detected motor output and the determined target output becomes zero. Further, the driving frequency determining unit sets the driving frequency at a resonance frequency which brings a spring vibration system including the mover into a resonance state when the determined target voltage value does not exceed a predetermined reference value, and sets the driving frequency at a frequency which is higher than the resonance frequency when the determined target voltage value exceeds the reference value. Moreover, the motor driver controls the motor output and the stroke of the mover by adjusting the frequency and voltage value of the AC voltage which is supplied to the linear vibration motor so that the voltage value of the AC voltage becomes equal to the target voltage value that is determined by the driving voltage determining unit, and so that the frequency of the AC voltage becomes equal to the driving frequency that is determined by the driving frequency determining unit. Therefore, the linear vibration motor can be efficiently driven at the resonance frequency until the required motor output reaches the maximum output at which driving of the linear vibration motor at the resonance frequency is restricted by the voltage level of the power supply. Furthermore, in a high output region where the required motor output exceeds the maximum output, the linear vibration motor can be driven at a frequency which is higher than the resonance frequency without a considerable reduction in the driving efficiency.

Furthermore, output control for the linear vibration motor becomes a feedback control in which the voltage value of the driving voltage is adjusted with the motor output which is required of the linear vibration motor being the target output, whereby output control for the linear vibration motor can be carried out with high accuracy, stability, and responsivity.

According to a tenth aspect of the present invention, in accordance with the motor driving apparatus of the ninth aspect, the reference value is determined based on the voltage value of a DC power supply which is provided for the motor driver, and the driving frequency determining unit changes the driving frequency to a frequency at which the determined target voltage value does not exceed the reference value when the determined target voltage value exceeds the reference value. Therefore, in a high output region where the motor output exceeds the maximum output which is restricted by the power supply voltage, the driving frequency is set at a frequency that is closest to the resonance frequency, whereby highly efficient driving of the linear vibration motor is realized. Further, when the motor output which is required of the linear vibration motor is decreased, the driving frequency can be smoothly returned to the resonance frequency.

According to an eleventh aspect of the present invention, the motor driving apparatus of the first aspect further includes a driving frequency determining unit for determining a driving frequency of the linear vibration motor, a target output determining unit for determining a target output as a motor output which is required of the linear vibration motor, an output detection unit for detecting the motor output of the linear vibration motor, a driving voltage determining unit for determining a target voltage value of the driving voltage of the linear vibration motor so that a difference between the detected motor output and the determined target output becomes zero, and a driving voltage detection unit for detecting an actual voltage value of the driving voltage of the linear vibration motor. Further, the driving frequency determining unit sets the driving frequency at a resonance frequency which brings a spring vibration system including the mover into a resonance state when the detected actual voltage value does not exceed a reference value that is determined based on the voltage value of a DC voltage which is supplied to the motor driver, and sets the driving frequency at a frequency which is higher than the resonance frequency when the detected actual voltage value exceeds the reference value. Moreover, the motor driver controls the motor output and the stroke of the mover by adjusting the frequency and voltage value of the AC voltage which is supplied to the linear vibration motor so that the voltage value of the AC voltage becomes equal to the target voltage value that is determined by the driving voltage determining unit, and so that the frequency of the AC voltage becomes equal to the driving frequency that is determined by the driving frequency determining unit. Therefore, the linear vibration motor can be efficiently driven even in a high output region, without being restricted by the voltage level of the power supply.

To be specific, even when the actual motor output is not equal to the required motor output, the linear vibration motor can be efficiently driven at the resonance frequency until the actual motor output reaches the maximum output at which driving of the linear vibration motor at the resonance frequency is restricted by the voltage level of the power supply. Further, in a high output region where the actual motor output of the linear vibration motor that is driven at the resonance frequency exceeds the maximum output, the linear vibration motor can be driven at a frequency which is higher than the resonance frequency, without significantly reducing the driving frequency. Moreover, in the high output region, the driving frequency is set at a frequency which is closest to the resonance frequency, at which the required motor output can be generated, whereby the driving frequency can be smoothly returned to the resonance frequency when the required motor output is decreased.

According to a twelfth aspect of the present invention, there is provided an air conditioner which is equipped with a compressor that has a cylinder and a piston, and compresses a fluid in the cylinder by a reciprocating motion of the piston. The air conditioner also includes: a linear vibration motor for making the piston reciprocate, where the linear vibration motor has a stator and a mover, which is supported by a spring so as to form a spring vibration system including the mover; and a motor driving unit for driving the linear vibration motor, which motor driving unit is a motor driving apparatus as defined in any one of the first through eleventh aspects. Therefore, friction loss can be reduced as compared with a conventional rotation-type motor, and further, sealability of the refrigerant between the high-pressure side and the low-pressure side is increased, whereby efficiency of the compressor is enhanced. Moreover, since friction loss is reduced, the amount of lubricating oil that is indispensable in the rotation-type motor can be significantly reduced. Thereby, recyclability is enhanced, and the amount of refrigerant to be filled in the compressor is reduced because the amount of refrigerant that dissolves into the oil is reduced, which results in a contribution to the conservation of the global environment. Further, since the performance of the linear compressor is controlled by the driving frequency, the linear compressor can be driven at maximum performance without being restricted by its construction, whereby a design that provides maximum efficiency at rated performance can be carried out. As a result, the air conditioner using the linear compressor can be reduced in size and increased in efficiency.

According to a thirteenth aspect of the present invention, there is provided a refrigerator which is equipped with a compressor that has a cylinder and a piston, and compresses a fluid in the cylinder by a reciprocating motion of the piston. The refrigerator also includes: a linear vibration motor for making the piston reciprocate, where the linear vibration motor has a stator and a mover, which is supported by a spring so as to form a spring vibration system including the mover; and a motor driving unit for driving the linear vibration motor, which motor driving unit is a motor driving apparatus as defined in any one of the first through eleventh aspects. Therefore, friction loss can be reduced as compared with a conventional rotation-type motor, and further, sealability of the refrigerant between the high-pressure side and the low-pressure side is increased, whereby efficiency of the compressor is enhanced. Moreover, since friction loss is reduced, the amount of lubricating oil that is indispensable in the rotation-type motor can be significantly reduced. Thereby, recyclability is enhanced, and the amount of refrigerant to be filled in the compressor is reduced because the amount of refrigerant that dissolves into the oil is reduced, which results in a contribution to the conservation of the global environment. Further, since performance the of the linear compressor is controlled by the driving frequency, the linear compressor can be driven at maximum performance without being restricted by the construction, whereby design that provides maximum efficiency at rated performance can be carried out. As a result, the refrigerator using the linear compressor can be reduced in size and increased in efficiency.

According to a fourteenth aspect of the present invention, there is provided a cryogenic freezer which is equipped with a compressor that has a cylinder and a piston, and compresses a fluid in the cylinder by a reciprocating motion of the piston. The cryogenic freezer also includes: a linear vibration motor for making the piston reciprocate, where the linear vibration motor has a stator and a mover, which is supported by a spring so as to form a spring vibration system including the mover; and a motor driving unit for driving the linear vibration motor, which motor driving unit is a motor driving apparatus as defined in any one of the first through eleventh aspects. Therefore, friction loss can be reduced as compared with a conventional rotation-type motor, and further, sealability of the refrigerant between the high-pressure side and the low-pressure side is increased, whereby efficiency of the compressor is enhanced. Moreover, since friction loss is reduced, the amount of lubricating oil that is indispensable in the rotation-type motor can be significantly reduced. Thereby, recyclability is enhanced, and the amount of refrigerant to be filled in the compressor is reduced because the amount of refrigerant that dissolves into the oil is reduced, which results in a contribution to the conservation of the global environment. Further, since the performance of the linear compressor is controlled by the driving frequency, the linear compressor can be driven at maximum performance without being restricted by the construction, whereby design that provides maximum efficiency at rated performance can be carried out. As a result, the cryogenic freezer using the linear compressor can be reduced in size and increased in efficiency.

According to a fifteenth aspect of the present invention, there is provided a hot-water supply unit which is equipped with a compressor that has a cylinder and a piston, and compresses a fluid in the cylinder by a reciprocating motion of the piston. The hot-water supply unit also includes: a linear vibration motor for making the piston reciprocate, where the linear vibration motor has a stator and a mover, which is supported by a spring so as to form a spring vibration system including the mover; and a motor driving unit for driving the linear vibration motor, which motor driving unit is a motor driving apparatus as defined in any one of the first through eleventh aspects. Therefore, friction loss can be reduced as compared with a conventional rotation-type motor, and further, sealability of the refrigerant between the high-pressure side and the low-pressure side is increased, whereby efficiency of the compressor is enhanced. Moreover, since friction loss is reduced, the amount of lubricating oil that is indispensable in the rotation-type motor can be significantly reduced. Thereby, recyclability is enhanced, and the amount of refrigerant to be filled in the compressor is reduced because the amount of refrigerant that dissolves into the oil is reduced, which results in a contribution to the conservation of the global environment. Further, since the performance of the linear compressor is controlled by the driving frequency, the linear compressor can be driven at maximum performance without being restricted by the construction, whereby design that provides maximum efficiency at rated performance can be carried out. As a result, the hot-water supply unit using the linear compressor can be reduced in size and increased in efficiency.

According to a sixteenth aspect of the present invention, there is provided a handy phone which is equipped with a linear vibration motor for generating vibration, and a motor driving unit for driving the linear vibration motor, wherein the linear vibration motor has a stator and a mover, which is supported by a spring so as to form a spring vibration system including the mover. The motor driving unit is a motor driving apparatus as defined in any one of the first through eleventh aspects. Therefore, vibration can be informed to the outside with the two degrees of freedom, i.e., the number of vibrations and the amplitude (vibration), whereby variations of vibration patterns can be increased as compared with the case where vibration is generated using the conventional rotation-type motor. Moreover, since the output of the linear vibration motor is controlled by adjusting the driving frequency, the linear vibration motor can be driven at the maximum performance without being restricted by the construction, thereby generating more powerful vibration.

BRIEF DESCRIPTION OF THE DRAWINGS

FIGS. 3(a)–3(c) are diagrams for explaining a motor driving apparatus according to a third embodiment of the present invention, wherein FIG. 3(a) is a block diagram of the motor driving apparatus, and FIGS. 3(b) and 3(c) are diagrams illustrating examples of the operations of the motor driving apparatus.

FIGS. 4(a) and 4(b) are diagrams for explaining a motor driving apparatus according to a fourth embodiment of the present invention, wherein FIG. 4(a) is a block diagram of the motor driving apparatus, and FIG. 4(b) is a diagram illustrating an example of the operation of the motor driving apparatus.

FIGS. 5(a)–5(c) are diagrams for explaining a motor driving apparatus according to a fifth embodiment of the present invention, wherein FIG. 5(a) is a block diagram of the motor driving apparatus, and FIGS. 5(b) and 5(c) are diagrams illustrating examples of the operations of the motor driving apparatus.

FIGS. 6(a) and 6(b) are diagrams for explaining the driving principle of the motor driving apparatus according to the fifth embodiment, wherein FIG. 6(a) illustrates an equivalent circuit of a linear vibration motor which is to be driven by the motor driving apparatus, and FIG. 6(b) illustrates modeled dynamic characteristics of the equivalent circuit.

FIGS. 7(a)–7(d) are diagrams for explaining the driving principle of the motor driving apparatus according to the fifth embodiment, wherein the relations in phases among the terminal voltages of the respective elements of the equivalent circuit, the driving voltage, and the driving current in the case where the driving frequency varies are shown by vectors.

FIGS. 8(a)–8(c) are diagrams for explaining a motor driving apparatus according to a sixth embodiment of the present invention, wherein FIG. 8(a) is a block diagram of the motor driving apparatus, and FIGS. 8(b) and 8(c) are diagrams illustrating examples of the operations of the motor driving apparatus.

DETAILED DESCRIPTION OF THE INVENTION

Hereinafter, embodiments of the present invention will be described.

First Embodiment

Figure 1:
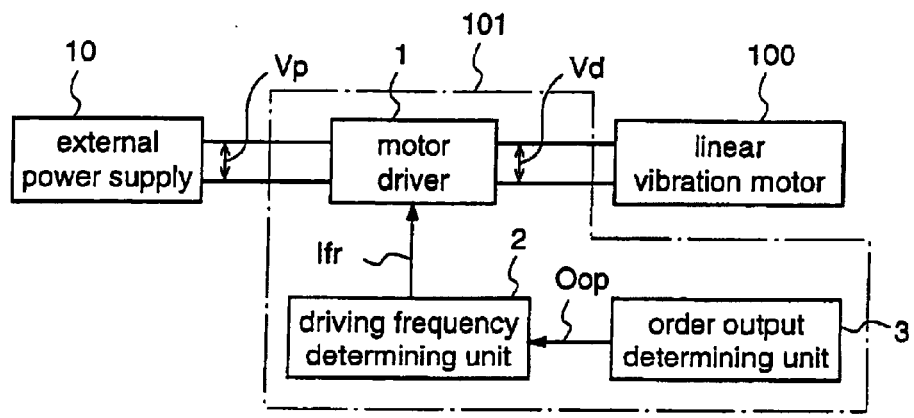
FIG. 1 is a block diagram for explaining a motor driving apparatus according to a first embodiment of the present invention.

FIG. 1 is a block diagram for explaining a motor driving apparatus according to a first embodiment of the present invention.

A motor driving apparatus 101 according to the first embodiment drives a linear vibration motor 100, which has a stator, a mover, and a support spring that supports the mover so as to form a spring vibration system including the mover, at a driving frequency according to a required motor output. The stator comprises an electromagnet which is obtained by winding a coil around an iron core, and the mover comprises a permanent magnet.

More specifically, the motor driving apparatus 101 includes an order output determining unit 3 for determining a target output that is a motor output which is required of the linear vibration motor 100, and outputting an output order signal Oop indicating the determined target output.

Further, the motor driving apparatus 101 includes a driving frequency determining unit 2 for determining a driving frequency of the linear vibration motor 100 based on the output order signal Oop so as to output a driving frequency signal Ifr indicating the determined driving frequency. The motor driving apparatus 101 also includes a motor driver 1 for applying, as a driving voltage, an AC voltage Vd having a predetermined frequency to the linear vibration motor 100 based on the driving frequency signal Ifr.

Hereinafter, the motor driver 1, the driving frequency determining unit 2, and the order output determining unit 3, which are constituents of the motor driving apparatus 101, will be described in detail.

The motor driver 1 receives a DC voltage Vp having a constant voltage level from an external power supply 10, generates an AC voltage Vd having a constant amplitude value and a frequency which is equal to the driving frequency that is determined by the driving frequency determining unit 2, based on the driving frequency signal Ifr that is outputted from the driving frequency determining unit 2, and applies the AC voltage Vd as a driving voltage to the linear vibration motor 100. While the motor driver 1 outputs the AC voltage Vd having a constant amplitude value, the motor driver 1 may change the amplitude value of the AC voltage Vd to be output. In this case, the output of the linear vibration motor 100 can be controlled more minutely. Further, the motor driver 1 may apply an AC voltage on which a DC voltage for correcting the center of vibration of the reciprocating mover is superposed, to the linear vibration motor 100.

More specifically, the motor driver 1 can be implemented by a power amplifier using a transistor or by an inverter using a switching element. The power amplifier with a transistor can be easily implemented by using a circuit structure that is generally used for an audio power amplifier or the like. Moreover, this power amplifier is characterized in that the noise level of the output voltage is low because the power amplifier generates an AC voltage by a smooth increase/decrease in the transistor output. On the other hand, the inverter with a switching element is characterized in that the energy loss during the switching operation is ideally zero because the ON resistance is zero and the OFF resistance is infinity, and thereby the power amplifier can drive the linear vibration motor 100 at a high efficiency.

The order output determining unit 3 determines a target output as a motor output which is required of the linear vibration motor 100, based on at least one of the operating condition of the linear vibration motor 100 and the operating condition of equipment which uses the linear vibration motor as a driving source.

The operating condition of the linear vibration motor 100 depends on, for example, the performance that is required of the linear vibration motor, and the performance varies depending on the application patterns of the linear vibration motor. For example, when the linear vibration motor 100 is applied to a vibration generator of a handy phone, which informs a user of an incoming call by vibration, the performance that is required of the linear vibration motor is rhythmically changing the intensity of vibration that informs the user of an incoming call.

On the other hand, the operating condition of equipment utilizing the linear vibration motor 100 as a driving source varies depending on the type of the equipment. For example, when the linear vibration motor 100 is applied to a compressor, the operating condition of the equipment is the pressure or temperature of a fluid to be compressed. Especially when the compressor is incorporated in an air conditioner, the operating condition of the equipment is the indoor temperature or outdoor temperature. Further, when the compressor is incorporated in a refrigerator, the operating condition of the equipment is the temperature inside the refrigerator, or the like. Furthermore, when the linear vibration motor 100 is applied to a shaver, the operating condition of the equipment is the thickness of the beard. Thus, the operating condition of the equipment is the condition of the load on the equipment.

The driving frequency determining unit 2 determines a driving frequency of the linear vibration motor 100 based on the order output that is indicated by the output order signal Oop, i.e., the motor output that is required of the linear vibration motor 100, which is determined by the order output determining unit 3, and then outputs a driving frequency signal Ifr indicating the determined driving frequency to the motor driver 1.

As a concrete method for determining the driving frequency, there is considered a method using a table or a computational expression in which the values of the order output that is indicated by the output order signal Oop are associated with the values of the driving frequency. Further, specific relationship between the value of the order output and the value of the driving frequency is as follows. That is, as the value of the order output corresponding to the value of the driving frequency is smaller, the value of driving frequency is farther from the resonance frequency. Such a relationship is based on a phenomenon that the motor output that is generated by the linear vibration motor is at a maximum when the driving frequency of the linear vibration motor is equal to the resonance frequency, and the generated motor output is reduced as the driving frequency of the linear vibration motor gets farther from the resonance frequency. The resonance frequency is the driving frequency of the linear vibration motor at which the spring vibration system including the mover is in the resonance state.

The operation of the motor driving apparatus 101 will now be described.

In this first embodiment, the motor driving apparatus 101 determines a driving frequency at which the linear vibration motor 100 generates a desired motor output, and applies an AC voltage Vd having a constant amplitude value and a frequency which is equal to the determined driving frequency to the linear vibration motor 100, thereby driving the linear vibration motor 100.

To be specific, in the motor driving apparatus 101, when the AC voltage Vd which is outputted from the motor driver 1 is applied to the linear vibration motor 100 to start the operation of the linear vibration motor 100, a motor output that is required of the linear vibration motor 100 is determined by the order output determining unit 3 based on the operating condition of the linear vibration motor 100 or the operating condition of the equipment having the linear vibration motor 100 as a driving source, and an output order signal Oop indicating the determined motor output is output to the driving frequency determining unit 2.

Then, in the driving frequency determining unit 2, a driving frequency of the linear vibration motor 100 is determined based on the output order signal Oop that is outputted from the order output determining unit 3, and a driving frequency signal Ifr indicating the determined driving frequency is output to the motor driver 1.

In the motor driver 1, the frequency of the generated AC voltage Vd is adjusted so as to be equal to the driving frequency which is determined by the driving frequency determining unit 2 based on the driving frequency signal Ifr, and the amplitude-fixed AC voltage Vd having the frequency which is equal to the driving frequency is output from the motor driver 1 to the linear vibration motor 100.

When the linear vibration motor 100 is driven by a pulse voltage which is supplied from the motor driver 1, adjustment of the AC current is carried out by changing the frequency of a pulse signal that is outputted from an oscillator. When this oscillator is a VCO (Voltage-Controlled Oscillator) in which the frequency of an output pulse is varied by voltage control, the motor output is controlled by adjusting the control voltage of the VCO. This output control is relatively simple as compared with the case where the duty ratio of the pulse signal that is outputted from the oscillator is controlled by using specific hardware or the like.

As described above, the motor driving apparatus 101 according to the first embodiment is provided with the order output determining unit 3 for determining the motor output that is required of the linear vibration motor 100 based on the operating condition of the linear vibration motor 100 or the like, and the driving frequency determining unit 2 for determining the driving frequency of the linear vibration motor 100 based on the motor output which is determined by the order output determining unit 3, and the motor driving apparatus 101 applies the amplitude-fixed AC voltage Vd having the frequency which is equal to the determined driving frequency to the linear vibration motor 100. Therefore, the output of the linear vibration motor 100 can be controlled with its amplitude level being kept constant, by adjusting the frequency of the AC voltage which is applied to the linear vibration motor, whereby output control for the linear vibration motor can be easily carried out.

Furthermore, since the output of the linear vibration motor can be adjusted according to the frequency of the AC voltage, the maximum output of the linear vibration motor can be increased without modifying the specification of the linear vibration motor or the power supply thereof, and the maximum output of the linear vibration motor is not restricted by the structure of the linear vibration motor or the voltage level of the external DC power supply.

Second Embodiment

Figure 2:
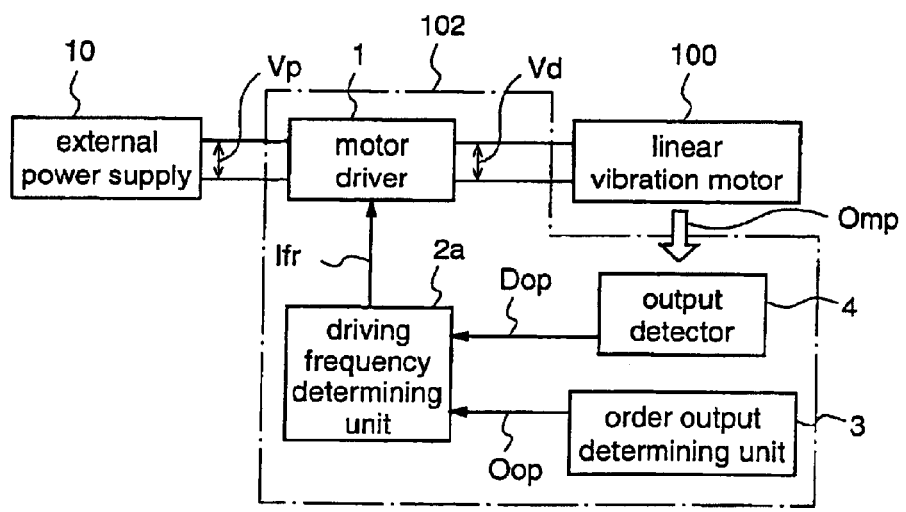
FIG. 2 is a block diagram for explaining a motor driving apparatus according to a second embodiment of the present invention.

FIG. 2 is a block diagram for explaining a motor driving apparatus according to a second embodiment of the present invention.

A motor driving apparatus 102 according to the second embodiment drives a linear vibration motor 100, which has a stator, a mover, and a support spring that supports the mover so as to form a spring vibration system including the mover, while adjusting the driving frequency so as to reduce a difference between the motor output and a desired motor output. The linear vibration motor 100 according to this second embodiment is identical to that of the first embodiment.

More specifically, the motor driving apparatus 102 includes an order output determining unit 3 for determining a target output that is a motor output which is required of the linear vibration motor 100 so as to output an output order signal Oop indicating the determined target output. The motor driving apparatus 102 also includes an output detector 4 for detecting a motor output Omp which is generated by the linear vibration motor 100 so as to output an output detection signal Dop indicating the detected motor output.

Further, the motor driving apparatus 102 includes a driving frequency determining unit 2a for determining a driving frequency of the linear vibration motor 100 based on the output order signal Oop that is outputted from the order output determining unit 3 and the output detection signal Dop that is outputted from the output detector 4, and for outputting a driving frequency signal Ifr indicating the determined driving frequency. The motor driving apparatus 102 also includes a motor driver 1 for applying a driving voltage (AC voltage) Vd having a predetermined frequency to the linear vibration motor 100 based on the driving frequency signal Ifr that is outputted from the driving frequency determining unit 2a.

Hereinafter, the motor driver 1, the driving frequency determining unit 2a, the order output determining unit 3, and the output detector 4, which are constituents of the motor driving apparatus 102, will be described in detail.

The motor driver 1 and the order output determining unit 3 are identical to those of the motor driving apparatus 101 according to the first embodiment.

The output detector 4 detects a motor output Omp that is generated by the linear vibration motor 100 so as to output an output detection signal Dop indicating the detected motor output. A concrete detection method which is adopted by the output detector 4 includes detecting at least one of the operating condition of the linear vibration motor 100 and the operating condition of a system in which the linear vibration motor 100 is incorporated, and estimating a motor output Omp to be generated by the linear vibration motor 100 based on the detected operating condition.

The driving frequency determining unit 2a adjusts a driving frequency of the linear vibration motor 100 so that a difference between the motor output which is determined by the order output determining unit 3 and indicated by the output order signal Oop, and the motor output which is detected by the output detector 4 and indicated by the output detection signal Dop becomes zero, thereby determining the driving frequency.

To be specific, the driving frequency determining unit 2a compares the order output with the detected output, and changes the driving frequency so as to increase the detected output when the detected output is lower than the order output, and conversely, changes the driving frequency to decrease the detected output when the detected output is higher than the order output.

However, a change in the driving frequency with which the detected output increases and a change in the driving frequency with which the detected output decreases cannot be uniquely determined as a change in either direction between the driving frequency increasing direction and the driving frequency decreasing direction. The reason therefor is as follows. Depending on the operating conditions of the linear vibration motor 100, there are cases where the motor output increases even when the driving frequency is decreased, and where the motor output decreases even when the driving frequency is increased.

Accordingly, in this second embodiment, the driving frequency determining unit 2a judges whether the motor output is increased or decreased when the driving frequency was changed last based on the motor outputs which are detected before and after the change of the driving frequency. The driving frequency determining unit 2a then changes the driving frequency in an appropriate direction between the increasing direction and the decreasing direction so that the detected motor output approaches the desired motor output based on the judgment result.

The operation of the motor driving apparatus 102 will now be described.

In this second embodiment, the motor driving apparatus 102 drives the linear vibration motor 100 while performing feedback control so that the actual motor output of the linear vibration motor 100 matches the motor output which is required of the niear vibration motor 100.

To be specific, in the motor driving apparatus 102, when the AC voltage Vd that is outputted from the motor driver 1 is applied to the linear vibration motor 100 to start the operation of the linear vibration motor 100, a motor output which is required of the linear vibration motor 100 is determined by the order output determining unit 3 based on the operating condition of the linear vibration motor 100 or the operating condition of the equipment including the linear vibration motor 100 as a driving source, as in the motor driving apparatus 101 according to the first embodiment, and an output order signal Oop indicating the determined motor output is sent to the driving frequency determining unit 2a.

In the output detector 4, a motor output Omp that is generated by the linear vibration motor 100 is detected, and an output detection signal Dop indicating the detected motor output is sent to the driving frequency determining unit 2a.

In the driving frequency determining unit 2a, a driving frequency of the linear vibration motor 100 is determined so that the detected output matches the order output based on the output order signal Oop that is outputted from the order output determining unit 3 and the output detection signal Dop that is outputted from the output detector 4, and a driving frequency signal Ifr indicating the determined driving frequency is output to the motor driver 1.

More specifically, in the driving frequency determining unit 2a, the order output and the detected output are compared. When the detected output is lower than the order output, the driving frequency is changed so as to increase the detected output. Conversely, when the detected output is higher than the order output, the driving frequency is changed so as to decrease the detected output.

In the motor driver 1, as in the first embodiment, the frequency of the generated AC voltage Vd is adjusted so as to be equal to the driving frequency which is determined by the driving frequency determining unit 2a based on the driving frequency signal Ifr, and then, the amplitude-fixed AC voltage Vd having the frequency which is equal to the driving frequency is output from the motor driver 1 to the linear vibration motor 100.

As described above, the motor driving apparatus 102 according to the second embodiment is provided with the order output determining unit 3 for determining the motor output which is required of the linear vibration motor 100, the output detector 4 for detecting the motor output Omp that is generated by the linear vibration motor 100, and the driving frequency determining unit 2a for determining the driving frequency of the linear vibration motor 100 so that the motor output that is detected by the output detector 4 matches the motor output that is determined by the order output determining unit 3. The motor driving apparatus 102 so constructed applies the amplitude-fixed AC voltage Vd having the frequency which is equal to the determined driving frequency to the linear vibration motor 100. Therefore, as in the first embodiment, the output of the linear vibration motor 100 can be controlled in the state where the amplitude level of the AC voltage that is applied to the linear vibration motor is kept constant, and further, the maximum output of the linear vibration motor can be increased without modifying the specification of the linear vibration motor or the power supply thereof.

Furthermore, in this second embodiment, the motor output from the linear vibration motor 100 is detected, and the driving frequency of the linear vibration motor 100 is adjusted so that the detected motor output matches the order output. Therefore, control for the motor output of the linear vibration motor becomes feedback control targeted at the order output which is determined by the order output determining unit 3, thereby resulting in stable and precise output control for the linear vibration motor.

Third Embodiment

FIG. 3(a) is a block diagram for explaining a motor driving apparatus according to a third embodiment of the present invention.

A motor driving apparatus 103 according to the third embodiment drives a linear vibration motor 100, which has a stator, a mover, and a support spring that supports the mover so as to form a spring vibration system including the mover, at a driving frequency that is determined based on the position of the mover. The linear vibration motor 100 of this third embodiment is identical to that of the first embodiment.

To be specific, the motor driving apparatus 103 includes: a position detector 5 for detecting the position of the reciprocating mover, and outputting a position detection signal Dposi indicating the detected mover position; a resonance frequency determining unit 6 for outputting a resonance frequency signal Dreso indicating the resonance frequency of the linear vibration motor 100; a driving frequency determining unit 2b for determining a driving frequency of the linear vibration motor 100 based on the position detection signal Dposi that is outputted from the position detector 5 and the resonance frequency signal Dreso that is outputted from the resonance frequency determining unit 6, and outputting a driving frequency signal Ifr indicating the determined driving frequency; and a motor driver 1 for applying an AC voltage Vd having a constant amplitude value and a predetermined frequency to the linear vibration motor 100 based on the driving frequency signal Ifr that is outputted from the driving frequency determining unit 2b.

Hereinafter, the motor driver 1, the position detector 5, the resonance frequency determining unit 6, and the driving frequency determining unit 2b, which are constituents of the motor driving apparatus 103, will be described in detail.

The motor driver 1 is identical to the motor driver 1 of the motor driving apparatus 101 according to the first embodiment.

The position detector 5 detects the position of the reciprocating mover. A concrete method for detecting the mover position is as follows. That is, by using a position sensor which is incorporated in the linear vibration motor 100, the position of the reciprocating mover when the mover is closest to the position sensor is detected. Preferably, the position sensor is placed in a predetermined position on a straight line along the mover vibrating direction.

Alternatively, the mover position may be detected by measuring a distance between the mover and a specific position in the system including the linear vibration motor 100 by using a position sensor. Further, without using a position sensor, the mover position may be estimated based on the mass of the mover, the spring constant of the support spring, and the driving voltage and current which are applied to the linear vibration motor.

The resonance frequency determining unit 6 outputs a resonance frequency signal Dreso indicating a resonance frequency as a single natural frequency of the spring vibration system, which is estimated from the mass of the mover and the spring constant.

However, the resonance frequency determining unit 6 is not restricted to outputting a signal indicating the single natural frequency that is estimated from the mass of the mover and the spring constant. The resonance frequency determining unit 6 may determine the resonance frequency of the spring vibration system based on the load condition of the linear vibration motor 100 as well as the mass of the mover and the spring constant, thereby to output a signal indicating the determined resonance frequency. In this case, the resonance frequency can be determined according to the operating conditions by utilizing a table or the like including a plurality of correspondences between resonance frequencies and combinations of the mass of the mover, the spring constant, and the load conditions of the linear vibration motor 100. Since the mass of the mover and the spring constant have constant values, the above-described table substantially includes a plurality of correspondences between the values of parameters indicating plural load conditions of the linear vibration motor, and the values of resonance frequencies at the respective load conditions. Further, when fluctuations in the resonance frequency with variations in the load condition of the linear vibration motor can be ignored, the resonance frequency determining unit 6 may output a resonance frequency signal indicating a single typical value of the resonance frequency. In this case, the above-mentioned table is not necessary.

Further, when the resonance frequency significantly fluctuates according to the load conditions of the linear vibration motor 100, there is employed a method for determining the resonance frequency by adjusting the frequency of the AC current that is supplied to the linear vibration motor 100 so as to satisfy predetermined conditions. For example, two resonance frequency determining methods are proposed as follows.

The first resonance frequency determining method utilizes, when the phase of displacement of the mover and the phase of the AC current that is supplied to the linear vibration motor 100 deviate by 90° from each other, the frequency of this supply current as the resonance frequency of the linear vibration motor. In this method, the frequency of the supply current is adjusted so that the phase of displacement of the mover and the phase of the supply current deviate by 90°, and the frequency which is obtained by this adjustment is determined to be the resonance frequency.

The second resonance frequency determining method utilizes, when the power applied to the linear vibration motor 100 becomes maximum under the state where the amplitude of the AC current supplied to the motor 100 is kept constant, the frequency of this supply current as the resonance frequency of the linear vibration motor. In this method, the frequency of the supply current is adjusted so that the supply power becomes maximum with the amplitude of the supply current being kept constant, and the frequency which is obtained by the adjustment is determined to be the resonance frequency.

In the allowable stroke state where the mover position which is detected by the position detector 5 does not exceed a predetermined reference position, the driving frequency determining unit 2b sets the driving frequency of the linear vibration motor 100 at the resonance frequency which is determined by the resonance frequency determining unit 6. On the other hand, in the over stroke state where the detected position exceeds the predetermined reference position, the driving frequency determining unit 2b sets the driving frequency of the linear vibration motor 100 at a frequency that is higher than the resonance frequency which is determined by the resonance frequency determining unit 6.

The reference position is determined based on an elastic limit of the spring member supporting the mover. However, the reference position may be determined based on the critical position of the mover at which the mover collides against the parts of the linear vibration motor 100 or the parts of the equipment including the linear vibration motor 100. Actually, when the possibility of collision of the mover is higher than the possibility of breakage of the spring member, the reference position is determined based on the critical mover position. Conversely, when the possibility of breakage of the spring member is higher than the possibility of collision of the mover, the reference position is determined based on the elastic limit of the spring member.

The operation of the motor driving apparatus 103 will now be described.

In this third embodiment, the motor driving apparatus 103 drives the linear vibration motor 100 at a driving frequency according to the position of the reciprocating mover.

To be specific, in the motor driving apparatus 103, when the AC voltage Vd is supplied from the motor driver 1 to the linear vibration motor 100 to start the operation of the linear vibration motor, the position detector 5 detects the position of the reciprocating mover of the linear vibration motor 100, and a position detection signal Dposi indicating the detected mover position is output from the position detector 5 to the driving frequency determining unit 2b.

Further, a resonance frequency signal Dreso indicating the resonance frequency of the linear vibration motor 100 is output from the resonance frequency determining unit 6 to the driving frequency determining unit 2b.

In the driving frequency determining unit 2b, a driving frequency of the linear vibration motor 100 is determined based on the position detection signal Dposi that is outputted from the position detector 5 and the resonance frequency signal Dreso that is outputted from the resonance frequency determining unit 6, and a driving frequency signal Ifr indicating the determined driving frequency is output to the motor driver 1.

To be specific, in the driving frequency determining unit 2b, when the mover is in the allowable stroke state where the mover position which is detected by the position detector 5 does not exceed the predetermined reference, the driving frequency of the linear vibration motor 100 is set at the resonance frequency which is determined by the resonance frequency determining unit 6. On the other hand, when the mover is in the over stroke state where the detected mover position exceeds the reference position, the driving frequency of the linear vibration motor 100 is set at a frequency that is higher than the resonance frequency which is determined by the resonance frequency determining unit 6.

In the motor driver 1, as in the first embodiment, the frequency of the generated AC voltage Vd is adjusted so as to be equal to the driving frequency which is determined by the driving frequency determining unit 2b based on the driving frequency signal Ifr, and the amplitude-fixed AC voltage Vd having the frequency which is equal to the driving frequency is output from the motor driver 1 to the linear vibration motor 100.

As described above, the motor driving apparatus 103 according to the third embodiment is provided with the motor driver 1 for driving the linear vibration motor 100 with the AC voltage having a frequency which is equal to the determined driving frequency, and the position detector 5 for detecting the position of the mover of the linear vibration motor 100. In the motor driving apparatus 103 so constructed, the driving frequency is set at the resonance frequency of the linear vibration motor when the mover is in the allowable stroke state where the detected mover position does not exceed a predetermined reference position, while the driving frequency is set at a frequency which is higher than the resonance frequency when the mover is in the over stroke state where the detected position exceeds the reference position. Therefore, in a low output region where the stroke length of the mover does not exceed the allowable range even if the linear vibration motor is driven at the resonance frequency, the linear vibration motor can be driven with higher efficiency. On the other hand, in a high output region where the stroke length of the mover exceeds the allowable range if the linear vibration motor is driven at the resonance frequency, the stroke length of the mover can be restricted to the allowable range by changing the driving frequency. Thereby, the mover can be prevented from breaking due to a collision against the motor body, and the mover supporting spring can be prevented from breaking due to over-extension.

While the driving frequency determining unit 2b in the third embodiment performs determination of the driving frequency according to whether or not the detected mover position exceeds a predetermined reference position, determination of the driving frequency may be carried out by other methods as follows.

First Modification of the Driving Frequency Determining Method

FIG. 3(b) is a diagram for explaining a driving frequency determining method using two reference positions, according to a first modification of the third embodiment.

In this first modification, the driving frequency determining unit 2b uses, for determining a driving frequency Fx, a first reference position Pb1 and a second reference position Pb2 which are set in order of proximity from a critical position Plim of the mover.

Under the state where the stroke of the mover is increasing (refer to arrow X1 in FIG. 3(b)), the driving frequency is set at a frequency Fh which is higher than the resonance frequency only when the stoke increases to such extent that the detected position Px exceeds the first reference position Pb1. That is, when the detected position Px is between the second reference position Pb2 and the first reference position Pb1, the driving frequency Fx is maintained at the resonance frequency Freso. On the other hand, under the state where the stroke of the mover is decreasing (refer to arrow Y1 in FIG. 3(b)), the driving frequency Fx is set at the resonance frequency Freso only when the stroke decreases to such extent that the detected position Px does not reach the second reference position Pb2. That is, when the detected position Px is between the first reference position Pb1 and the second reference position Pb2, the driving frequency Fx is maintained at the frequency Fh which is higher than the resonance frequency Freso.

As described above, in the method of determining the driving frequency using two reference positions, determination of the driving frequency can be carried out with stability even when the detected position changes in the vicinity of the reference positions.

Second Modification of the Driving Frequency Determining Method

FIG. 3(c) is a diagram for explaining a driving frequency determining method using a predetermined critical zone instead of the reference position according to a second modification of the third embodiment.

In this second modification, the driving frequency determining unit 2b adjusts the driving frequency to decrease the stroke of the mover when the detected mover position is in a predetermined critical zone between the reference position and the critical position.

The lower-limit position Prb of the critical zone Z1 matches the reference position that is predetermined based on the critical position, and the upper-limit position Pru of the critical zone Z1 is apart from the critical position Plim by a predetermined distance.

In the driving frequency determining unit 2b, the driving frequency Fx is maintained at the resonance frequency Freso until the detected position Px enters the critical zone Z1 due to an increase in the stroke of the mover. When the detected position Px enters the critical zone Z1, frequency adjustment is started to increase the driving frequency so that the driving frequency deviates from the resonance frequency. While the detected position Px is in the critical zone Z1, the driving frequency Fx is set at a frequency which is more distant from the resonance frequency Freso as the detected position Px gets closer to the upper-limit position Pru of the critical zone Z1. When the detected position Px reaches the upper-limit position Pru of the critical zone Z1, the driving frequency Fx is set at the maximum frequency Fmax that is most distant from the resonance frequency Freso. Under the state where the detected position Px crosses the critical zone Z1 and approaches the critical position Plim, the driving frequency Fx is maintained at the maximum frequency Fmax.

Further, when the detected position Px is getting away from the critical position Plim, the driving frequency Fx gradually approaches the resonance frequency Freso under the state where the detected position Px is in the critical zone Z1. When the detected position Px is away from the critical position Plim beyond the lower-limit position Prb of the critical zone Z1, the driving frequency Fx is set at the resonance frequency Freso.

Setting of the driving frequency Fx under the state where the detected position Px is in the critical zone Z1 employs a table or a function indicating correspondences between the values of frequencies to be used as the driving frequency Fx, and the distances of the detected position Px from the lower-limit position Prb of the critical zone Z1. The function is not restricted to the linear function shown in FIG. 3(c). The function may be a higher-order function, such as a second-order or third-order function, in which an increase in the driving frequency is larger as the distance between the detected position Px and the lower-limit position Prb of the critical zone Z1 is longer.

As described above, in the method of determining the driving frequency using the critical zone, when the mover is in the allowable stroke state where the detected position Px is away from the critical position Plim beyond the lower-limit position Prb, the linear vibration motor can be driven with maximum efficiency by setting the driving frequency Fx at the resonance frequency Freso. Further, when the mover is in the over stroke state where the detected position Px approaches the critical position Plim across the lower-limit position Prb, reduction in the driving efficiency can be minimized while preventing breakage of the mover due to a collision with the inner wall of the body of the linear vibration motor 100, or breakage of the mover supporting spring due to over-extension.

Third Modification of the Driving Frequency Determining Method

In a third modification of the third embodiment, the driving frequency determining unit 2b simply sets the driving frequency Fx at a frequency which is higher than the resonance frequency Freso as the distance between the detected position Px and the reference position is longer, when the mover is in the over stroke state where the detected position Px exceeds the reference position. Also, in this case, setting of the driving frequency may employ a table or the like indicating correspondences between the distances of the detected position from the reference position, and the values of frequencies to be used as the driving frequency.

As described above, in the method of determining the driving frequency according to the distance between the detected position and the reference position, the over stroke state of the mover can be quickly and reliably returned to the allowable stroke state, and moreover, the driving frequency determining unit 2b can be implemented with a relatively simple circuit structure.

Fourth Embodiment

FIG. 4(a) is a block diagram for explaining a motor driving apparatus according to a fourth embodiment of the present invention.

A motor driving apparatus 104 according to the fourth embodiment drives a linear vibration motor 100, which has a stator, a mover, and a support spring that supports the mover so as to form a spring vibration system including the mover, at a driving frequency that is determined based on the position of the mover, and simultaneously, adjusts an amplitude value of an AC voltage to be applied as a driving voltage to the linear vibration motor 100 so that the motor output matches a desired motor output. The linear vibration motor 100 of this fourth embodiment is identical to that of the first embodiment.

More specifically, the motor driving apparatus 104 includes: an output detector 4 for detecting the motor output that is generated by the linear vibration motor 100, and outputting an output detection signal Dop indicating the detected motor output; an order output determining unit 3 for determining a target output as a motor output which is required of the linear vibration motor 100, and outputting an output order signal Oop indicating the determined target output; and a driving voltage determining unit 7 for determining an amplitude value of an AC voltage to be supplied as a driving voltage to the linear vibration motor 100 based on the output detection signal Dop that is outputted from the output detector 4 and the output order signal Oop that is outputted from the order output determining unit 3, and outputting a voltage amplitude signal Odv indicating the determined amplitude value.

The motor driving apparatus 104 further includes: a position detector 5 for detecting the position of the reciprocating mover of the linear vibration motor 100, and outputting a position detection signal Dposi indicating the detected mover position; and a resonance frequency determining unit 6 for outputting a resonance frequency signal Dreso indicating the resonance frequency of the linear vibration motor 100.

The motor driving apparatus 104 also includes: a driving frequency determining unit 2c for determining a driving frequency of the linear vibration motor 100 based on the position of the mover which is indicated by the position detection signal Dposi and the resonance frequency of the linear vibration motor which is indicated by the resonance frequency signal Dreso, and outputting a driving frequency signal Ifr indicating the determined driving frequency; and a motor driver 1a for applying, to the linear vibration motor 100, an AC voltage Vd having a frequency which is equal to the driving frequency that is indicated by the driving frequency signal Ifr, and having the amplitude value that is indicated by the voltage amplitude signal Odv.

Hereinafter, the motor driver 1a and the respective units 2c and 3–7 constituting the motor driving apparatus 104 will be described in detail.

The order output determining unit 3 is identical to the order output determining unit 3 that of the motor driving apparatus 101 according to the first embodiment. The output detector 4 is identical to the output detector 4 of the motor driving apparatus 102 according to the second embodiment. Further, the position detector 5 and the resonance frequency determining unit 6 are identical to those of the motor driving apparatus 103 according to the third embodiment.

The motor driver 1a of this fourth embodiment receives a DC voltage Vp having a constant voltage level from an external power supply 10, and applies, to the linear vibration motor 100, an AC voltage Vd having a frequency which is equal to the driving frequency that is determined by the driving frequency determining unit 2c and having the amplitude value that is determined by the driving voltage determining unit 7 based on the driving frequency signal Ifr and the voltage amplitude signal Odv. The AC voltage Vd which is applied to the linear vibration motor 100 may include a DC voltage component that corrects the center position of vibration of the reciprocating mover of the linear vibration motor 100.

Further, the motor driver 1a can be implemented by a power amplifier using a transistor or an inverter using a switching element.

As described for the first embodiment, a power amplifier using a transistor is characterized in that its circuit structure can easily be realized, and noise in its output voltage is relatively small. Further, an inverter using a switching element is characterized in that it can drive the linear vibration motor 100 with high efficiency.

The driving voltage determining unit 7 receives the output order signal Oop that is outputted from the order output determining unit 3 and the output detection signal Dop that is outputted from the output detector 4, and determines an amplitude value of the driving voltage of the linear vibration motor 100, i.e., an amplitude value of the AC voltage Vd to be supplied from the motor driver 1a to the linear vibration motor 100, based on a result of a comparison between the magnitude of the order output which is indicated by the output order signal Oop and the magnitude of the detection output which is indicated by the output detection signal Dop.

More specifically, the amplitude value of the AC voltage Vd is determined to be at a larger value when the detection output is smaller than the order output. Conversely, the amplitude value of the AC voltage Vd is determined to be at a smaller value when the detection output is larger than the order output.

While the driving voltage determining unit 7 in the fourth embodiment determines an amplitude value of the AC voltage to be applied as a driving voltage to the linear vibration motor 100, the driving voltage determining unit 7 may determine an rms (root mean square) value of the AC voltage Vd. Also, in this case, the same effect as in the case of determining an amplitude value of the AC voltage can be achieved.

The driving frequency determining unit 2c determines a driving frequency of the linear vibration motor 100 according to the position of the mover which is indicated by the position detection signal Dposi.

That is, the driving frequency determining unit 2c sets the driving frequency at the resonance frequency which is indicated by the resonance frequency signal Dreso when the position of the mover that is detected by the position detector 5 does not exceed a predetermined reference position. On the other hand, the driving frequency determining unit 2c sets the driving frequency at a frequency higher which is than the resonance frequency that is indicated by the resonance frequency signal Dreso when the detected mover position exceeds the predetermined reference position.

The reference position is determined based on an elastic limit of the spring member that supports the mover. Alternatively, the reference position may be determined based on a critical position of the mover at which the mover might collide against the parts constituting the linear vibration motor or the parts of the equipment including the linear vibration motor.

The operation of the motor driving apparatus 104 will now be described.

In this fourth embodiment, the motor driving apparatus 104 drives the linear vibration motor 100 while adjusting the amplitude value of the AC voltage to be applied as a driving voltage to the linear vibration motor 100 so that the motor output matches the required output, and adjusts the driving frequency of the linear vibration motor 100 based on the position of the mover.

That is, in the motor driving apparatus 104, when the output AC voltage Vd of the motor driver 1a is applied to the linear vibration motor 100 to start the operation of the linear vibration motor 100, a position Prm of the reciprocating mover of the linear vibration motor 100 is detected by the position detector 5, and a position detection signal Dposi indicating the detected position Prm of the mover is output from the position detector 5 to the driving frequency determining unit 2c.

Further, a resonance frequency signal Dreso indicating the resonance frequency of the linear vibration motor 100 is output from the resonance frequency determining unit 6 to the driving frequency determining unit 2c.

In the driving frequency determining unit 2c, a driving frequency of the linear vibration motor 100 is determined based on the position detection signal Dposi that is outputted from the position detector 5 and the resonance frequency signal Dreso that is outputted from the resonance frequency determining unit 6, and a driving frequency signal Ifr indicating the determined driving frequency is output to the motor driver 1a.

To be specific, in the driving frequency determining unit 2c, as in the driving frequency determining unit 2b of the third embodiment, when the mover of the linear vibration motor 100 is in the allowable stroke state where the detected position does not exceed a predetermined reference position, the driving frequency of the linear vibration motor 100 is set at the resonance frequency which is determined by the resonance frequency determining unit 6. On the other hand, when the mover is in the over stroke state where the detected position exceeds the predetermined reference position, the driving frequency of the linear vibration motor 100 is set at a frequency which is higher than the resonance frequency determined by the resonance frequency that is determining unit 6.

Further, in the output detector 4, a motor output Omp from the linear vibration motor 100 is detected, and an output detection signal Dop indicating the detected motor output is output to the driving voltage determining unit 7. In the order output determining unit 3, a target output, as a motor output which is required of the linear vibration motor 100, is determined, and an output order signal Oop indicating the determined target output is output to the driving voltage determining unit 7.

In the driving voltage determining unit 7, an amplitude value of the AC voltage Vd to be supplied to the linear vibration motor 100 is determined based on the output detection signal Dop and the output order signal Oop, and a voltage amplitude signal Odv indicating the determined amplitude value is supplied to the motor driver 1a. In determining the amplitude value, the amplitude value of the AC voltage Vd is changed to a larger value when the detected output Dop is smaller than the order output Oop, and conversely, the amplitude value of the AC voltage Vd is changed to a smaller value when the detected output Dop is larger than the order output Oop.

In the motor driver 1a, the AC voltage Vd to be applied to the linear vibration motor 100 is adjusted so that the frequency of the AC voltage Vd matches the driving frequency which is determined by the driving frequency determining unit 2c and the amplitude value thereof matches the amplitude value which is determined by the driving voltage determining unit 7, based on the driving frequency signal Ifr and the voltage amplitude signal Odv.

As described above, the motor driving apparatus 104 according to the fourth embodiment is provided with the position detector 5 for detecting the position of the mover, and the output detector 4 for detecting the motor output of the linear vibration motor 100. Accordingly, the motor driving apparatus 104 adjusts the amplitude value of the AC voltage that is applied to the linear vibration motor 100 so that the motor output matches a required output, and further, determines the driving frequency of the linear vibration motor 100 based on the detected mover position. Therefore, feedback control for the motor output is carried out by the adjustment of the amplitude value of the AC voltage, and the mover is prevented from getting too close to the critical position by the adjustment of the driving frequency.

That is, the motor output is always maintained at the required output by the feedback control. Further, in the allowable stroke state where the detected mover position does not reach the reference position, the driving frequency of the linear vibration motor is set at the resonance frequency so as to perform a highly-efficient drive of the linear vibration motor. In the over stroke state where the detected mover position exceeds the reference position, the driving frequency of the linear vibration motor is set at a frequency which is higher than the resonance frequency so as to decrease the stroke of the mover.

As a result, even in the state where a further increase in the stroke of the mover might cause a collision of the mover against the inner wall of the linear vibration motor 100 or a breakage of the spring that supports the mover due to its extension over a critical extension value, the output of the linear vibration motor can be increased while avoiding such a collision between the mover and the motor body or a breakage of the support spring.

In other words, in this fourth embodiment, it is possible to increase the motor output of the linear vibration motor 100 to the required output by increasing the driving frequency under the state where the stroke length of the mover is fixed at an allowable maximum stroke length. Therefore, the stroke length of the mover is maintained so that the position of the mover does not exceed the reference position, and the AC voltage generating the required motor output is applied to the linear vibration motor, whereby the linear vibration motor can be driven at the required motor output without incurring a collision between the mover and the motor body or a breakage of the support spring.

While the driving frequency determining unit 2c in the fourth embodiment performs a determination of a driving voltage according to whether or not the detected mover position exceeds the predetermined reference position, other methods as described below may be employed for the determination of a driving voltage.

First Modification of the Driving Frequency Determining Method

Figure 3:
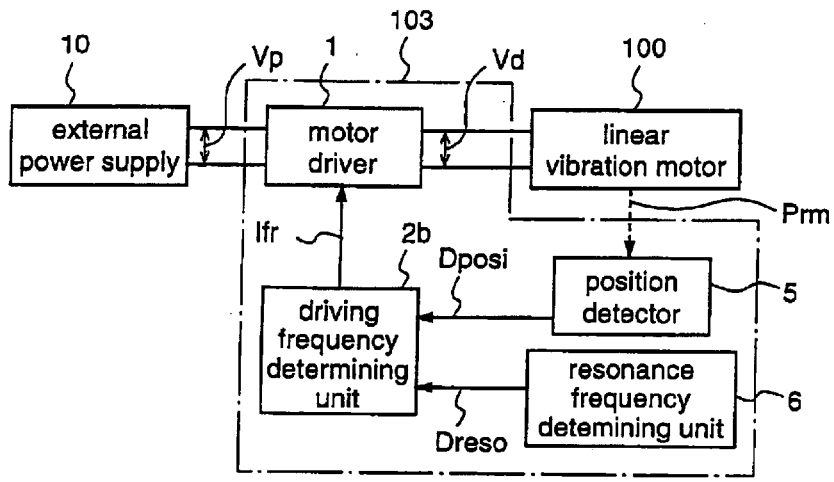
Figure 3:
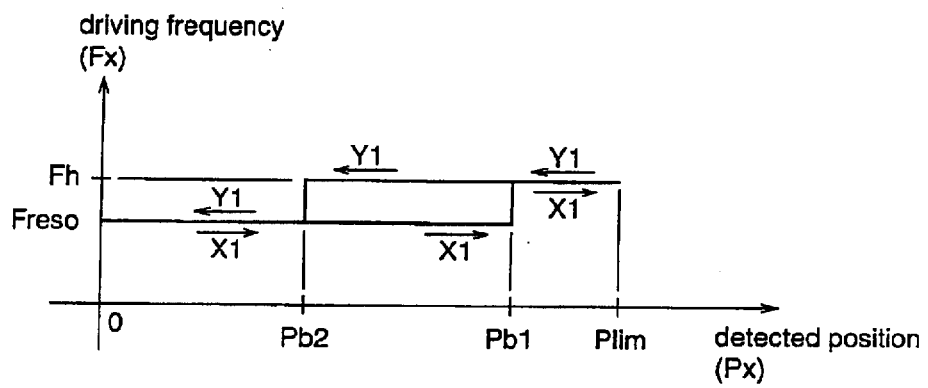
Figure 3:
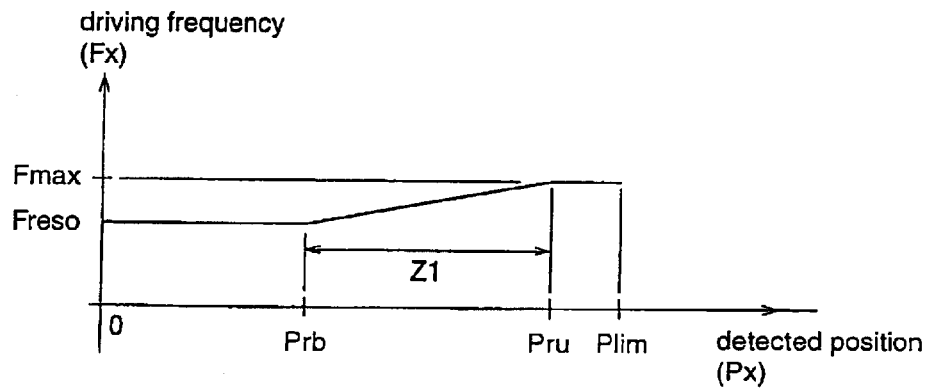

FIG. 4(*b*) is a diagram for explaining a driving frequency determining method employing two reference positions according to a first modification of the fourth embodiment, which is similar to the example shown in FIG. 3(*b*).

In the first modification, as shown in FIG. 4(*b*), the driving frequency determining unit 2c uses, for determining the driving frequency, a first reference position Pb1 and a second reference position Pb2 which are set in order of proximity from the critical position Plim of the mover, similar to the driving frequency determining unit 2b of the third embodiment. The driving frequency determining unit 2c compares the detected position Px of the mover with the first reference position Pb1 when the stroke of the mover is increasing, and compares the detected position Px with the second reference position Pb2 when the stroke is decreasing so as to determine the driving frequency.

As described above, in the method of determining the driving frequency using the two reference positions, even when the detected position changes in the vicinity of the reference points, the determination of the driving frequency can be carried out with stability.

Second Modification of the Driving Frequency Determining Method

The driving frequency determining unit 2c may set the driving frequency Fx at a higher frequency that is larger than the resonance frequency as the detected position Px gets closer to the critical position Plim, when the detected position Px of the mover is in a predetermined critical zone Z1 (refer to FIG. 3(*c*)).

As described above, in the method of determining the driving frequency using the critical zone, the driving frequency can be maximized in the low output region, while the driving frequency can be maintained as high as possible in the high output region while avoiding a collision of the mover or a breakage of the support spring.

Modification of the Driving Voltage Amplitude Determining Method

While the motor driving apparatus 104 in the fourth embodiment determines the amplitude value of the driving voltage Vd to be applied to the linear vibration motor 100 based on the detected motor output and the required motor output, the amplitude value of the driving voltage Vd may be determined based on the detected mover position as well as the detected motor output and the required motor output.

FIG. 4(*b*) is a diagram for explaining a modification of the driving voltage amplitude determining method according to the fourth embodiment, illustrating four operating conditions DS1–DS4 of the linear vibration motor.

In this modification, the driving voltage determining unit 7 determines the amplitude value of the AC voltage Vd so that the detected motor output matches the required motor output, when the detected mover position does not exceed the reference position. That is, the driving voltage determining unit 7 increases the amplitude value of the AC voltage Vd in the driving state DS1 where the detected motor output is smaller than the required motor output, and decreases the amplitude value of the AC voltage Vd in the driving state DS2 where the detected motor output is larger than the required motor output.

Further, in the driving state DS3 where the detected mover position exceeds the reference position, and the detected motor output is smaller than the required motor output, the driving voltage determining unit 7 adjusts the amplitude value of the supply voltage Vd so that the detected mover position is in the predetermined range. That is, the driving voltage determining unit 7 decreases the amplitude value of the supply voltage Vd when the detected position is likely to go out of the predetermined range due to an increase in the stroke length of the mover. Conversely, the driving voltage determining unit 7 increases the amplitude value of the AC voltage Vd when the detected position is likely to go out of the predetermined range due to a decrease in the stroke length of the mover.

Furthermore, in the driving state DS4 where the detected mover position exceeds the reference position and the detected motor output is larger than the required motor output, the driving voltage determining unit 7 decreases the amplitude value of the AC voltage Vd so that the detected motor output matches the required motor output.

As described above, the amplitude value of the supply voltage Vd to the linear vibration motor 100 is determined based on the detected motor output, the required motor output, and the detected mover position. Therefore, in the over stroke state, the motor output control and the mover position control by the driving voltage determining unit 7 are carried out based on the detected position, similar to the motor output control and mover position control by the driving frequency determining unit 2c, whereby the control by the driving voltage determining unit 7 and the control by the driving frequency determining unit 2c can be smoothly and reliably carried out without incurring interference between these controls.

Fifth Embodiment

Figure 5:
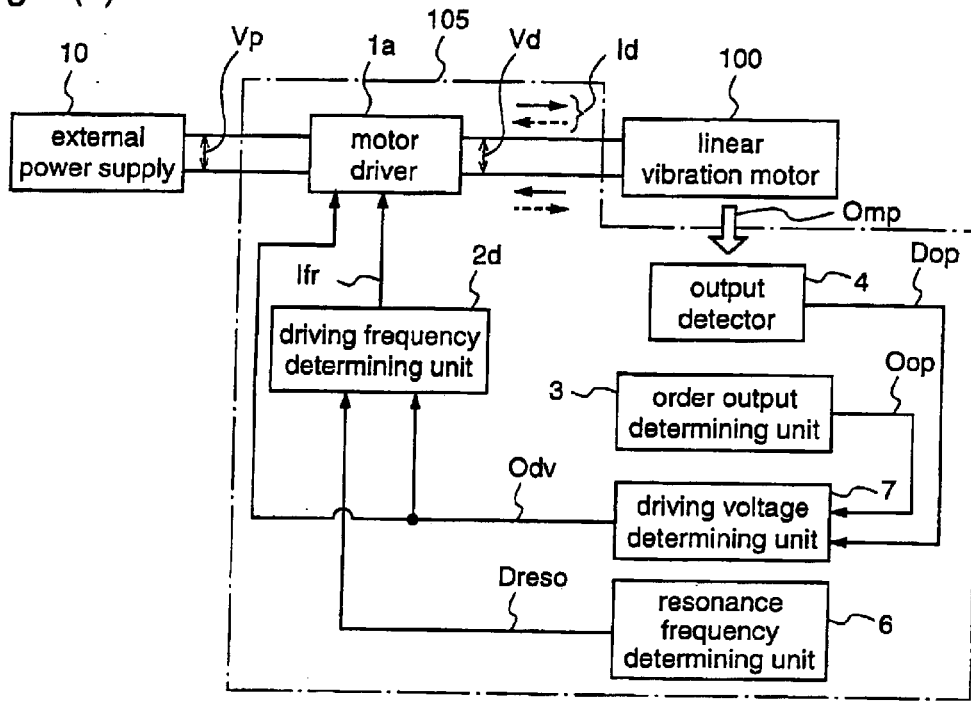
Figure 5:
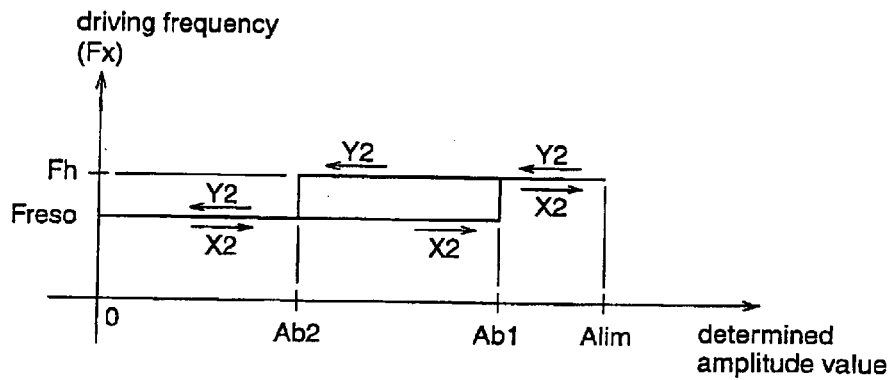
Figure 5:
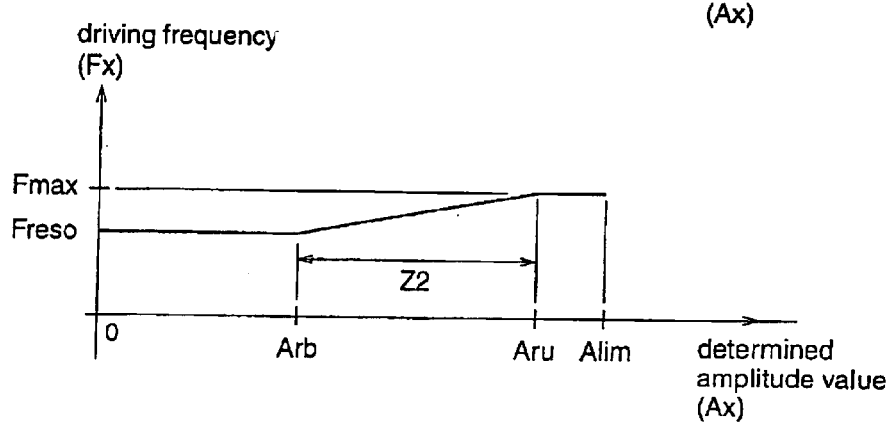

FIG. 5(a) is a block diagram for explaining a motor driving apparatus according to a fifth embodiment of the present invention.

A motor driving apparatus 105 according to the fifth embodiment is provided with a driving frequency determining unit 2d for determining a driving frequency of a linear vibration motor 100 based on a voltage amplitude signal Odv as an output of a driving voltage determining unit 7, instead of the position detector 5 and the driving frequency determining unit 2c of the motor driving apparatus 104 according to the fourth embodiment. The other constituents of the motor driving apparatus 105 are identical to those of the motor driving apparatus 104 of the fourth embodiment.

To be specific, a motor driver 1a, an order output detector 3 (determining unit), an output detector 4, a resonance frequency determining unit 6, and a driving frequency determining unit 7, which are included in the motor driving apparatus 105 of the fifth embodiment, are identical to those of the motor driving apparatus 104 of the fourth embodiment.

The driving frequency determining unit 2d of this fifth embodiment determines a driving frequency of the linear vibration motor 100 according to whether or not the amplitude value which is indicated by the voltage amplitude signal Odv that is outputted from the driving voltage determining unit 7, in other words, the amplitude value of the driving voltage which is determined so that the motor output matches the required output, exceeds a predetermined reference value.

That is, the driving frequency determining unit 2d sets the driving frequency of the linear vibration motor 100 at the resonance frequency which is indicated by the resonance frequency signal Dreso that is outputted from the resonance frequency determining unit 6 when the amplitude value which is indicated by the voltage amplitude signal Odv does not exceed a predetermined constant reference value. On the other hand, the driving frequency determining unit 2d sets the driving frequency of the linear vibration motor 100 at a specific frequency which is higher than the resonance frequency that is indicated by the resonance frequency signal Dreso when the amplitude value which is indicated by the voltage amplitude signal Odv exceeds the predetermined constant reference value. To be specific, the specific frequency is a frequency that is a predetermined frequency higher than the resonance frequency.

While the driving frequency determining unit 2d in the fifth embodiment compares the amplitude value which is indicated by the voltage amplitude signal Odv that is outputted from the driving voltage determining unit 7 with the predetermined constant reference value, the driving frequency determining unit 2d may compare the amplitude value with a voltage value of a DC power supply which is inputted to the motor driver 1a, or with a voltage value that is obtained by a predetermined calculation using the voltage value of the DC power supply.

The operation of the motor driving apparatus 105 according to the fifth embodiment will now be described.

In this fifth embodiment, the motor driving apparatus 105 adjusts the amplitude value of the AC voltage to be applied to the linear vibration motor 100 so that the motor output matches the required output, and simultaneously, drives the linear vibration motor 100 at a driving frequency according to the adjusted amplitude value of the AC voltage.

More specifically, in the motor driving apparatus 105, when the output AV voltage Vd of the motor driver 1a is applied to the linear vibration motor 100 to start the operation of the linear vibration motor 100, the output detector 4 detects the motor output that is generated by the linear vibration motor 100, and an output detection signal Dop indicating the detected motor output is output to the driving voltage determining unit 7. In the order output determining unit 3, a motor output which is required of the linear vibration motor 100 is determined, and an output order signal Oop indicating the determined motor output is output to the driving voltage determining unit 7.

Then, in the driving voltage determining unit 7, an amplitude value of the AC voltage to be supplied to the linear vibration motor 100 is determined based on the output detection signal Dop and the output order signal Oop, and a voltage amplitude signal Odv indicating the determined amplitude value is output to the driving frequency determining unit 2d and to the motor driver 1a.

Further, a resonance frequency signal Dreso indicating the resonance frequency of the linear vibration motor 100 is output from the resonance frequency determining unit 6 to the driving frequency determining unit 2d.

In the driving frequency determining unit 2d, a driving frequency of the linear vibration motor 100 is determined based on the voltage amplitude signal Odv that is outputted from the driving voltage determining unit 7 and the resonance frequency signal Dreso that is outputted from the resonance frequency determining unit 6, and a driving frequency signal Ifr indicating the determined driving frequency is output to the motor driver 1a. To be specific, in the driving frequency determining unit 2d, when the amplitude value which is indicated by the voltage amplitude signal Odv does not exceed the predetermined reference value, the driving frequency of the linear vibration motor 100 is determined at the resonance frequency thereof. On the other hand, when the amplitude value exceeds the predetermined reference value, the driving frequency of the linear vibration motor 100 is determined at a frequency which is higher than the resonance frequency.

In the motor driver 1a, the AC voltage Vd to be applied to the linear vibration motor 100 is adjusted so as to have a frequency which is equal to the driving frequency that is determined by the driving frequency determining unit 2d and an amplitude value which is equal to the amplitude value that is determined by the driving voltage determining unit 7, based on the driving frequency signal Ifr and the voltage amplitude signal Odv.

Next, the characteristics of the motor driving apparatus 105 according to the fifth embodiment will be described using mathematical expressions and figures showing logical grounds.

Figure 6:
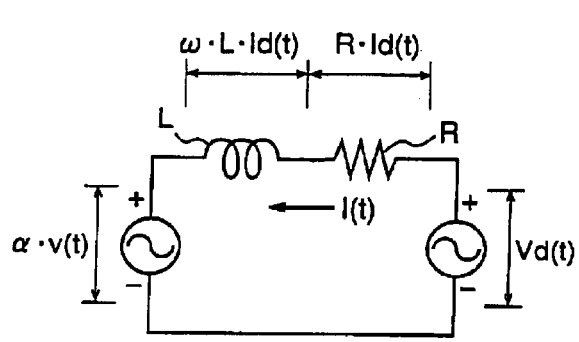
Figure 6:
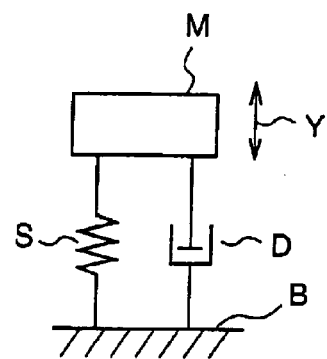

FIG. 6(a) is a diagram illustrating an equivalent circuit of the linear vibration motor.

In FIG. 6(a), L is the equivalent inductance [H] of a coil as a constituent of the linear vibration motor, and R is the equivalent resistance [Ω] of the coil. Further, Vd(t) is the instantaneous value [V] of the AC voltage which is applied to the linear vibration motor, and Id(t) is the instantaneous value [A] of the AC current which is supplied to the linear vibration motor. Furthermore, α is the thrust constant [N/A] of the linear vibration motor, v(t) is the instantaneous value [m/s] of velocity of the mover of the linear vibration motor, and α·v(t) is the instantaneous value [V] of an induced electromotive voltage Vind that occurs due to driving of the linear vibration motor.

The thrust constant α of the linear vibration motor shows a force [N] that occurs when a unit current [A] is applied to the linear vibration motor. Further, while the unit of the thrust constants is expressed by [N/A], this unit is equivalent to [Wb/s] and [V·s/m].

The equivalent circuit shown in FIG. 6(a) is derived from the Kirchhoff's law. From the equivalent circuit, formula (1) showing the relationship among the instantaneous value of velocity of the mover of the linear vibration motor, the instantaneous value of the driving current, and the instantaneous value of the driving voltage, is derived as follows.

$$\alpha \cdot v = V - R \cdot I - L \frac{dI}{dt} \quad (1)$$

Since the factors α[N/A], R[Ω], and L[H] used in formula (1) are constants which are unique to the motor, variables that vary with time are the vector v showing the instantaneous value v(t)[m/s] of velocity of the mover, the vector V showing the instantaneous value Vd(t)[V] of the driving voltage, and the vector I showing the instantaneous value Id(t)[A] of the driving current.

FIGS. 7(a)–7(d) are vector diagrams showing the variables in formula (1). In FIGS. 7(a)–7(d), the phase relationships among the instantaneous value v(t)[m/s] of the velocity of the mover, the instantaneous value Vd(t)[V] of the applied voltage, and the instantaneous value Id(t)[A] of the driving current are shown using the velocity vector v, voltage vector V, and current vector I corresponding to the respective values.

Further, in FIGS. 7(a)–7(d), terminal voltages that are generated at the respective circuit elements in the equivalent circuit are shown by vectors with reference to the phase of the supply current Id(t). In FIGS. 7(a)–7(d), ω is the frequency of the AC current Id(t) which is supplied to the linear vibration motor, α·v is the voltage vector showing the included voltage Vind (=α×v(t)), R·I is the voltage vector indicating the terminal voltage R·Id(t) of the equivalent resistance, ω·LωI is the voltage vector indicating the terminal voltage ω·L·Id(t) of the equivalent inductance, and V0–V3 are the voltage vectors indicating the voltages Vd(t) which are applied to the linear vibration motor. Further, φ is the phase difference between the voltage Vd(t) and the current Id(t) which is supplied to the linear vibration motor, and β is the phase difference between the current Id(t) which is supplied to the linear vibration motor and the induced voltage Vind (=α·v(t)).

The dynamic characteristics of the linear vibration motor 100 are modeled by a single-degree-of-freedom viscous damping the vibration system shown in FIG. 6(b). The single-degree-of-freedom viscous damping vibration system is obtained by adding a damper D for damping vibration of a mass M to a single-degree-of-freedom vibration system, i.e., a vibration system in which the mass M is supported by a spring S against a base B so that the mass Mcan vibrate in a single direction (Y direction).

When the linear vibration motor is in the driving state, as shown in FIGS. 7(a)–7(d), the sum of the voltage vector a v indicating the induced voltage Vind (=α·v(t)), the voltage vector R·I indicating the terminal voltage R·Id(t) of the equivalent resistance, and the voltage vector ω·L·I indicating the terminal voltage ω·L·Id(t) of the equivalent inductance is equal to the voltage vector V indicating the applied voltage Vd.

Further, when the linear vibration motor is in the resonance state, the phase of the velocity v(t) of the mover of the linear vibration motor is equal to the phase of the electromagnetic force that moves the mover. Further, in the linear vibration motor, the induced voltage Vind (=α·v(t)) is a constant multiple of the velocity v(t) of the mover, and the supplied current Id(t) is proportional to the force that moves the mover. Accordingly, when the linear vibration motor is in the resonance state (voltage vector V=V0), the phase of the driving current Id(t) is equal to the phase of the induced voltage Vind (=α·v(t)) (refer to FIG. 7(a)).

Likewise, when the frequency of the exciting force that is repeatedly applied to the linear vibration motor, i.e., the frequency of the driving current Id(t), is lower than the resonance frequency (voltage vector V=V1), the phase of the velocity v(t) of the mover of the linear vibration motor is delayed by a phase difference β from the phase of the electromagnetic force that moves the mover, i.e., the phase of the driving current Id(t) (refer to FIG. 7(b)). Conversely, when the frequency of the exciting force is higher than the resonance frequency (voltage vector V=V2), the phase of the velocity v(t) of the mover of the linear vibration motor is advanced by a phase difference β from the phase of the electromagnetic force that moves the mover, i.e., the phase of the driving current Id(t) (refer to FIG. 7(c)).

As can be seen from FIG. 7(d), the phase of the supply current Id(t) and the phase of the supply voltage Vd(t) become equal to each other by setting the frequency ω of the current Id(t) to be supplied to the linear vibration motor 100 at an appropriate frequency which is higher than the resonance frequency of the linear vibration motor. The voltage vector V at this time is V3 (|V3|<|V2|<|V0|<|V1|).

When the frequency ω of the supply current Id(t) is set at a frequency which is higher than the resonance frequency (refer to FIG. 7(d)), the voltage V (=V3<V0) that is applied to the linear vibration motor is decreased as compared with the case where the frequency ω of the supply current Id(t) to the linear vibration motor is the resonance frequency of the linear vibration motor (refer to FIG. 7(a)).

Accordingly, when the amplitude value of the AC voltage Vd which is applied to the linear vibration motor cannot be increased due to the limitation of the output voltage of the motor driver 1a, the amplitude value of the required voltage to be applied to the linear vibration motor can be reduced with the motor output being kept constant by setting the frequency of the AC voltage that is applied to the linear vibration motor at an appropriate frequency which is higher than the resonance frequency, whereby the linear vibration motor can be driven in a higher output region.

As described above, the motor driving apparatus 105 according to the fifth embodiment is provided with the order output determining unit 3 for determining a motor output which is required of the linear vibration motor 100, the output detector 4 for detecting the motor output generated by the linear vibration motor 100, and the driving voltage determining unit 7 for determining the amplitude value of the AC voltage to be applied to the linear vibration motor 100 based on the detected motor output and the required motor output. In the motor driving apparatus 105 so constructed, the amplitude value of the voltage which is applied to the linear vibration motor 100 is determined so that the motor output matches the required output, and the driving frequency of the linear vibration motor is set at the resonance frequency until the amplitude value of the determined AC voltage exceeds a predetermined constant value. When the required amplitude value of the AC voltage exceeds the predetermined value, the driving frequency of the linear vibration motor is set at a frequency which is higher than the resonance frequency. Therefore, the linear vibration motor can be driven at the maximum efficiency until the determined supply voltage exceeds the predetermined value and, when the amplitude value of the determined voltage exceeds the predetermined value, the amplitude value of the supply voltage can be decreased with the motor output being kept constant, by adjusting the driving frequency of the linear vibration motor. As a result, the linear vibration motor can be driven even in a high output region where driving of the linear vibration motor at the resonance frequency is impossible due to restrictions by the power supply voltage.

In other words, in the motor driving apparatus 105 of the fifth embodiment, the amplitude of the driving voltage of the linear vibration motor is maintained at the allowable maximum value, and moreover, the driving frequency of the linear vibration motor is set at a frequency that is as close as possible to the resonance frequency, whereby a high motor output, which cannot be generated in driving at the resonance frequency, can be achieved without reducing the driving efficiency.

While the driving frequency determining unit 2d in the fifth embodiment performs a determination of the driving frequency according to whether or not the amplitude value of the driving voltage which is determined by the driving voltage determining unit 7 exceeds a predetermined reference value, the determination of the driving frequency may be performed by other methods as follows.

First Modification of the Driving Frequency Determining Method

FIG. 5(b) is a diagram for explaining a driving frequency determining method employing two reference positions, according to a first modification of the fifth embodiment.

In this first modification, as shown in FIG. 5(b), the driving frequency determining unit 2d employs a first reference value Ab1 and a second reference value Ab2 which is smaller than the first reference value for determining the driving frequency Fx. In this case, the driving frequency determining unit 2d compares the determined amplitude value Ax with the first reference value Ab1 when the stroke of the mover is increasing (refer to arrow X2 in FIG. 5(b)), and compares the determined amplitude value Ax with the second reference value Ab2 when the stroke of the mover is decreasing (refer to arrow Y2 in FIG. 5(b)), thereby determining the driving frequency Fx. In FIG. 5(b), Alim is a maximum value of the determined amplitude value Ax, and the concrete method for determining the driving frequency Fx is identical to the method of determining the driving frequency Fx based on the detected position Px, as shown in FIG. 3(b).

As described above, in the method of determining the driving frequency using the two reference values, a determination of the driving frequency can be carried out with stability even when the determined amplitude value changes in the vicinity of the reference values.

Second Modification of the Driving Frequency Determining Method

FIG. 5(c) is a diagram for explaining a driving frequency determining method using a predetermined critical zone instead of the reference value, according to a second modification of the fifth embodiment.

In this second modification, as shown in FIG. 5(c), the driving frequency determining unit 2d changes the driving frequency Fx according to a change in the determined amplitude value Ax, when the determined amplitude value Ax enters a predetermined critical zone Z2 which is provided between the reference value Arb and the critical value Alim.

The lower-limit value Arb of the critical zone Z2 is equal to the predetermined reference value used for the fifth embodiment, and the upper-limit value Aru of the critical zone Z2 is smaller than the critical value Alim by a predetermined amount. Further, in the critical zone Z2, the relationship between the determined amplitude value Ax and the driving frequency Fx is a primary monotone increasing function. When the determined amplitude value Ax is smaller than the lower-limit value Arb of the critical zone Z2, the driving frequency Fx is maintained at the resonance frequency Freso. When the determined amplitude value Ax exceeds the upper-limit value Aru of the critical zone Z2, the driving frequency Fx is set at the maximum frequency Fmax that is the farthest from the resonance frequency.

Setting of the driving frequency Fx in the critical zone Z2 may employ, not only the primary monotone increasing function, but also a table or another function which indicates the correspondences between the values of frequencies that are used as the driving frequency and the differences between the determined amplitude values Ax and the lower-limit value Arb of the critical zone Z2.

As described above, in the method of determining the driving frequency using the critical zone, when the determined amplitude value Ax is smaller than the lower-limit value Arb of the critical zone Z2, the linear vibration motor can be driven at the resonance frequency with maximum efficiency. On the other hand, when the determined amplitude value Ax is in the critical zone Z2, reduction in the driving efficiency can be suppressed as much as possible while avoiding a collision of the mover or a breakage of the mover supporting spring.

Sixth Embodiment

Figure 8:
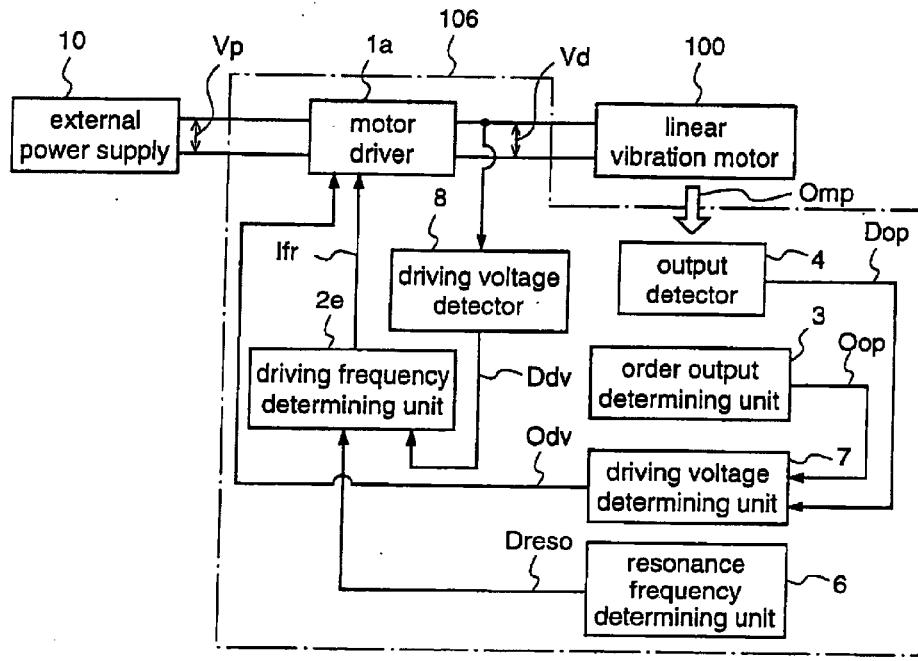
Figure 8:
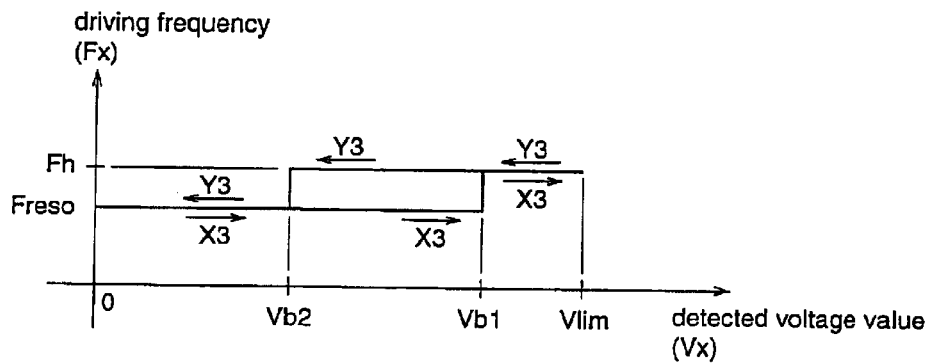
Figure 8:
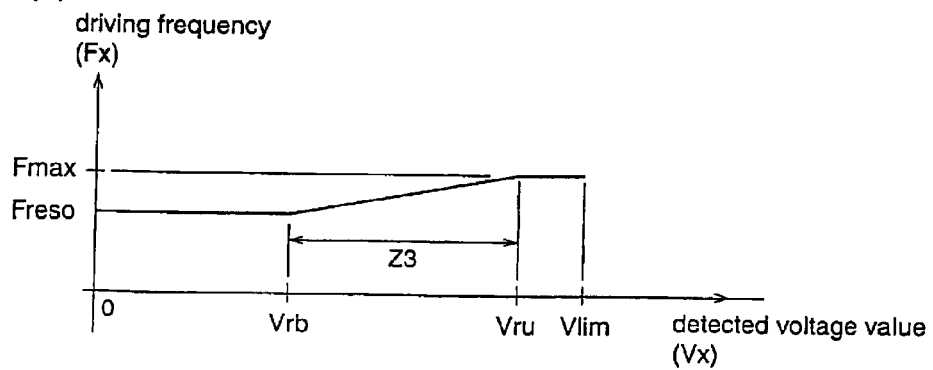

FIG. 8(a) is a block diagram for explaining a motor driving apparatus according to a sixth embodiment of the present invention.

A motor driving apparatus 106 according to the sixth embodiment is provided with a supply voltage detector 8 for detecting an output AC voltage Vd of the motor driver 1a, and a driving frequency determining unit 2e for determining a driving frequency based on the detected output voltage of a motor driver 1a, instead of the driving frequency determining unit 2d of the motor driving apparatus 105 according to the fifth embodiment. The other constituents of the motor driving apparatus 106 are identical to those of the motor driving apparatus 105 of the fifth embodiment.

That is, a motor driver 1a, an order output detector (determining unit) 3, an output detector 4, a resonance frequency determining unit 6, and a driving frequency determining unit 7 according to the sixth embodiment are identical to those of the motor driving apparatus 105 of the fifth embodiment.

The supply voltage detector 8 detects the voltage value of an AC voltage which is supplied from the motor driver 1a to the linear vibration motor 100, and outputs a voltage detection signal Ddv indicating the detected voltage value. The voltage detection signal Ddv indicates the amplitude value of the output voltage of the motor driver 1a, and there is a detection method using resistance-type potential division as a concrete method for detecting the amplitude value.

The driving frequency determining unit 2e determines the driving frequency of the linear vibration motor 100 according to whether or not the voltage value which is indicated by the voltage detection signal Ddv that is outputted from the supply voltage detector 8 exceeds a predetermined constant reference value.

More specifically, when the voltage value that is indicated by the voltage detection signal Ddv does not exceed the predetermined reference value, the driving frequency determining unit 2e sets the driving frequency of the linear vibration motor at the resonance frequency that is indicated by the output signal Dreso of the resonance frequency determining unit 6. On the other hand, when the detected voltage value exceeds the predetermined reference value, the driving frequency determining unit 2e sets the driving frequency of the linear vibration motor at a frequency which is higher than the resonance frequency that is indicated by the output signal Dreso of the resonance frequency determining unit 6.

While the driving frequency determining unit 2e in the sixth embodiment compares the voltage value which is indicated by the voltage detection signal Ddv that is outputted from the driving voltage detector 8 with the predetermined reference value, the driving frequency determining unit 2e may compare the voltage value which is indicated by the voltage detection signal Ddv with the voltage value of the DV power supply that is inputted to the motor driver 1a or with the voltage value which is obtained by a predetermined calculation using the voltage value of the DC power supply.

The operation of the motor driving apparatus 106 will now be described.

In this sixth embodiment, the motor driving apparatus 106 drives the linear vibration motor 100 at a driving frequency according to the detected level of the driving voltage thereof while adjusting the amplitude value of the AC voltage to be applied to the linear vibration motor 100 so that the motor output matches a required motor output.

That is, in the motor driving apparatus 106, when the output AC voltage Vd from the motor driver 1a is applied to the linear vibration motor 100 to start the operation of the linear vibration motor 100, a motor output Omp that is generated by the linear vibration motor 100 is detected by the output detector 4, and an output detection signal Dop indicating the detected motor output is output to the driving voltage determining unit 7. In the order output determining unit 3, a target output, as a motor output which is required of the linear vibration motor 100, is determined, and an output order signal Oop indicating the determined target output is output to the driving voltage determining unit 7.

Then, in the driving voltage determining unit 7, an amplitude value of the driving voltage of the linear vibration motor 100 is determined based on the output detection signal Dop and the output order signal Oop, and a voltage amplitude signal Odv indicating the determined amplitude value is supplied to the motor driver 1a.

In the supply voltage detector 8, the output voltage of the motor driver 1a, i.e., the voltage value of the actual AC voltage Vd which is supplied to the linear vibration motor 100 is detected, and a voltage detection signal Ddv indicating the voltage value of the detected AC voltage is output to the driving frequency determining unit 2e.

Further, a resonance frequency signal Dreso indicating the resonance frequency of the linear vibration motor 100 is output to the driving frequency determining unit 2e.

In the driving frequency determining unit 2e, a driving frequency of the linear vibration motor 100 is determined based on the resonance frequency signal Dreso and the voltage detection signal Ddv, and a driving frequency signal Ifr indicating the determined driving frequency is output to the motor driver 1a.

To be specific, in the driving frequency determining unit 2e, when the voltage value of the detected supply voltage does not exceed a predetermined constant reference value, the driving frequency of the linear vibration motor is determined at the resonance frequency that is indicated by the output of the resonance frequency determining unit 6. On the other hand, when the voltage value of the detected supply voltage exceeds the predetermined reference value, the driving frequency of the linear vibration motor 100 is determined at a frequency which is higher than the resonance frequency that is indicated by the output of the resonance frequency determining unit 6.

In the motor driver 1a, the AC voltage Vd which is applied to the linear vibration motor is adjusted so that the frequency thereof matches the driving frequency which is determined by the driving frequency determining unit 2e, and the amplitude value thereof becomes equal to the amplitude value that is determined by the driving voltage determining unit 7, based on the voltage amplitude signal Odv and the driving frequency signal Ifr.

As described above, the motor driving apparatus 106 according to the sixth embodiment is provided with the output detector 4 for detecting the motor output Omp of the linear vibration motor 100, and the supply voltage detector 8 for detecting the voltage value of the voltage Vd which is supplied from the motor driver 1a to the linear vibration motor 100, and drives the linear vibration motor at the driving frequency according to the detected value of the output voltage of the motor driver 1a while adjusting the amplitude value of the output voltage from the motor driver 1a to be applied to the linear vibration motor 100 so that the motor output matches the required motor output. Therefore, the linear vibration motor can be driven at the maximum efficiency in the low output region, while a motor output which is higher than the maximum output that is determined by the maximum amplitude of the driving voltage can be generated in the high output region.

That is, until the detected value of the output from the driver exceeds the predetermined reference value, even when there is a difference between the motor output of the linear vibration motor and the motor output which is required of the linear vibration motor, the linear vibration motor can be driven with the maximum efficiency by adjusting the motor output according to the amplitude value of the driving voltage under the state where the driving frequency of the linear vibration motor is set at the resonance frequency. Further, when the detected level of the driver output voltage exceeds the predetermined value, the required motor output can be generated by setting the driving frequency of the linear vibration motor at a frequency which is higher than the resonance frequency, without increasing the amplitude value of the driving voltage. Thereby, the linear vibration motor can be driven in the high output region, without being restricted by the voltage level of the power supply, with minimizing a reduction in the motor driving efficiency, and furthermore, a collision between the mover and the motor body or a breakage of the support spring can be avoided.

Furthermore, under the state where the detected level of the driver output voltage exceeds the predetermined level, the driving frequency is changed to a frequency which is close to the resonance frequency according to a decrease in the detected level, whereby the driving frequency can be smoothly returned to the resonance frequency when the required motor output is decreased to such extent that the detected level of the driver output voltage becomes lower than the predetermined level.

While the driving frequency determining unit 2e in the sixth embodiment performs a determination of the driving frequency according to whether or not the voltage value of the driving voltage which is detected by the driving voltage detector 8 exceeds a predetermined reference value, determination of the driving frequency may be performed by other methods as described below.

First Modification of the Driving Frequency Determining Method

FIG. 8(b) is a diagram for explaining a driving frequency determining method using two reference values, according to a first modification of the sixth embodiment.

In this first modification of the sixth embodiment, as shown in FIG. 8(b), the driving frequency determining unit 2e employs a first reference value Vb1 and a second reference value Vb2 which is smaller than the first reference value for determining the driving frequency Fx. In this case, the driving frequency determining unit 2e compares the detected voltage value Vx with the first reference value Vb1 when the stroke of the mover is increasing (refer to arrow X3 in FIG. 8(b)), and compares the detected voltage value Vx with the second reference value Vb2 when the stroke of the mover is decreasing (refer to arrow Y3 in FIG. 8(b)), thereby determining the driving frequency Fx. In FIG. 8(b), Vlim is a maximum value of the detected voltage value Vx, and the concrete method for determining the driving frequency Fx is identical to the method of determining the driving frequency Fx based on the detected position Px, as shown in FIG. 3(b).

As described above, in the method of determining the driving frequency using the two reference values, determination of the driving frequency can be carried out with stability even when the detected voltage value changes in the vicinity of the reference values.

Second Modification of the Driving Frequency Determining Method

FIG. 8(c) is a diagram for explaining a driving frequency determining method using a predetermined critical zone instead of the reference value, according to a second modification of the sixth embodiment.

In this second modification of the sixth embodiment, as shown in FIG. 8(c), the driving frequency determining unit 2e changes the driving frequency Fx according to a change in the detected voltage value Vx when the detected voltage value Vx is in a predetermined critical zone Z3 between the reference value Vrb and the critical value Vlim.

The lower-limit value Vrb of the critical zone Z3 is equal to the constant reference value which is used for the sixth embodiment, and the upper-limit value Vru of the critical zone Z3 is smaller than the critical value Vlim by a predetermined amount. Further, in the critical zone Z3, the relationship between the detected voltage value Vx and the driving frequency Fx is a primary monotone increasing function. When the detected voltage value Vx is smaller than the lower-limit value Vrb of the critical zone Z3, the driving frequency Fx is maintained at the resonance frequency Freso. When the detected voltage value Vx exceeds the upper-limit value Vru of the critical zone Z3, the driving frequency Fx is set at the maximum frequency Fmax that is the farthest from the resonance frequency.

Setting of the driving frequency Fx in the critical zone Z3 may employ, not only the primary monotone increasing function, but also a table or another function which indicates correspondences between the values of frequencies which are used as the driving frequency, and differences between the determined amplitude values Ax and the lower-limit value Arb of the critical zone Z3.

As described above, in the method of determining the driving frequency using the critical zone, when the detected voltage value Vx is smaller than the lower-limit value Vrb of the critical zone Z3, the linear vibration motor can be driven at the resonance frequency with the maximum efficiency. On the other hand, when the detected voltage value Vx is in the critical zone Z3, reduction in the driving efficiency can be minimized while avoiding a collision of the mover or a breakage of the mover supporting spring.

Seventh Embodiment

Figure 9:
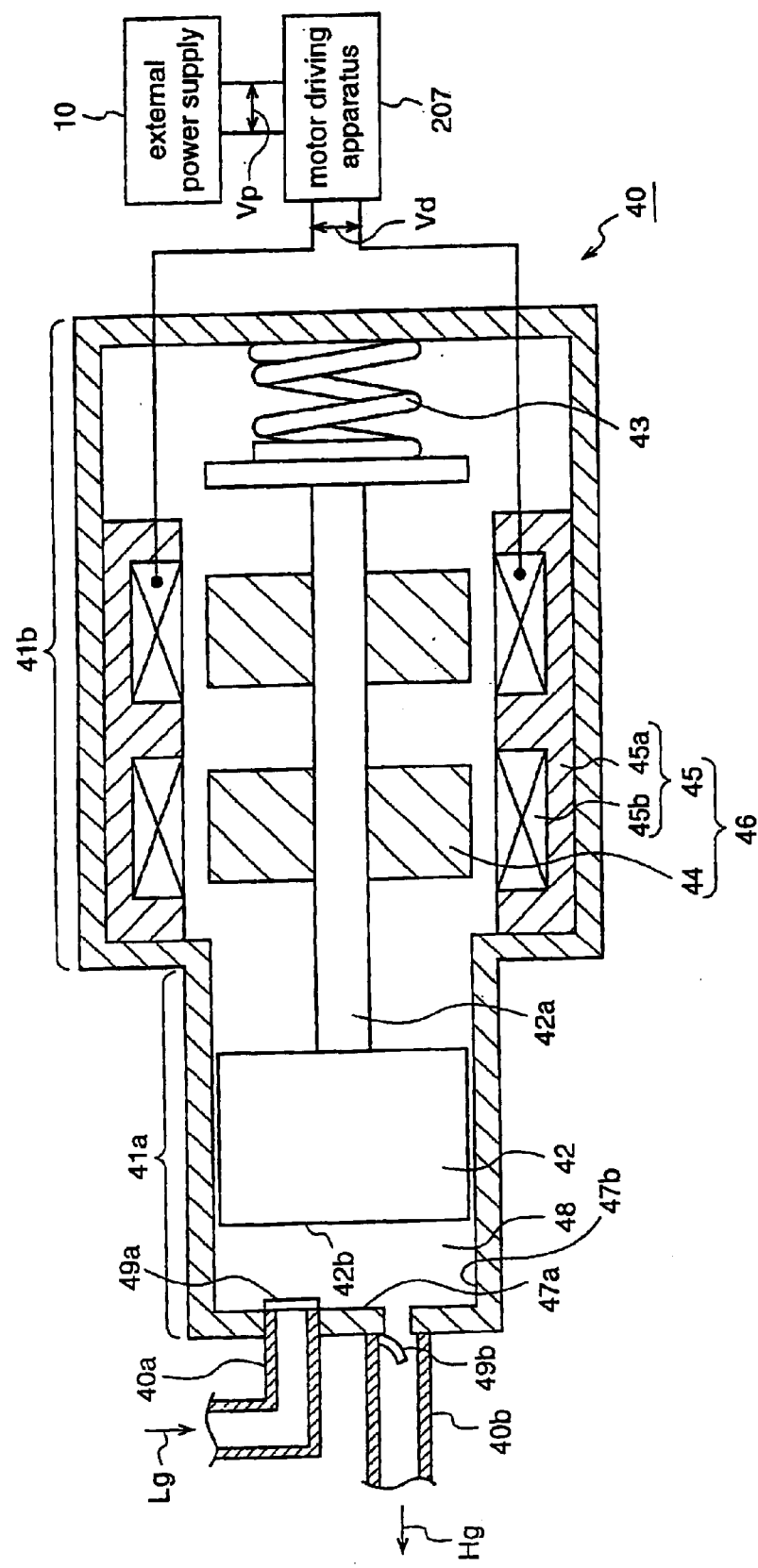
FIG. 9 is a schematic diagram for explaining a motor driving apparatus according to a seventh embodiment of the present invention.

FIG. 9 is a schematic diagram for explaining a compressor driving apparatus according to a seventh embodiment of the present invention.

A compressor driving apparatus 207 according to the seventh embodiment drives a compressor 40 for compressing air, gas, or the like. A power source of the compressor 40 is a linear vibration motor 46 which is identical to the linear vibration motor 100 according to the first embodiment. Further, the compressor driving apparatus 207 is a motor driving apparatus for driving the linear vibration motor 46, and the compressor driving apparatus 207 has the same construction as the motor driving apparatus 101 of the first embodiment. Hereinafter, the compressor 40 according to this seventh embodiment is referred to as a linear compressor, and this linear compressor 40 will now be briefly described.

The linear compressor 40 has a cylinder section 41a and a motor section 41b which are adjacent to each other along a predetermined axis line. A piston 42, which is slidably supported along the axis direction, is placed in the cylinder section 41a. A piston rod 42a, an end of which is fixed to the rear side of the piston 42, is placed across the cylinder section 41a and the motor section 41b, and a support spring 43 which applies a force to the piston rod 42a in the axis direction is provided on the other end of the piston rod 42a.

Further, a magnet 44 is fixed to the piston rod 42a, and an electromagnet 45 comprising an outer yoke 45a and a stator coil 45b which is embedded in the outer yoke 45a is fixed to a portion of the motor section 41b which is opposed to the magnet 44. In this linear compressor 40, the linear vibration motor 46 is constituted by the electromagnet 45 and the magnet 44 which is fixed to the piston rod 42a. Accordingly, in the linear compressor 40, the piston 42 reciprocates in its axis direction due to an electromagnetic force that is generated between the electromagnet 45 and the magnet 44, and an elasticity of the spring 43.

Further, in the cylinder section 41a, a compression chamber 48 is formed, which is a closed space that is surrounded by a cylinder upper portion inner wall 47a, a piston compression wall 42b, and a cylinder peripheral wall 41b. An end of a gas inlet tube 40a for sucking a low-pressure gas Lg from a gas flow path into the compression chamber 48 is opened at the cylinder upper portion inner wall 47a. Further, an end of a discharge tube 40b for discharging a high-pressure gas Hg from the compression chamber 48 to the gas flow path is opened at the cylinder upper portion inner wall 47a. An inlet valve 49a and a discharge valve 49b for preventing the back flow of the gas are fixed to the inlet tube 40a and the discharge tube 40b, respectively.

The motor driving apparatus 207 converts a DC output voltage Vp from an external power supply 10 into an AC driving voltage Vd, and applies the AC driving voltage Vd to the linear vibration motor 46. That is, the motor drive control apparatus 207 includes a motor driver 1, a driving frequency determining unit 2, and an order output determining unit 3, as shown in FIG. 1. The motor driving apparatus 207 controls a motor output which is required of the linear vibration motor 46 by adjusting the frequency of the AC driving voltage Vd which is applied to the linear vibration motor 46.

In the linear compressor 40 so constructed, the piston 42 reciprocates in its axis direction by intermittent application of the driving voltage from the motor driving apparatus 207 to the linear vibration motor 46, whereby suction of the low-pressure gas Lg into the compression chamber 48, compression of the gas in the compression chamber 48, and discharge of the compressed high-pressure gas Hg from the compression chamber 48 are repeatedly carried out.

Under the state where the linear compressor 40 is operating, a motor output which is required of the linear vibration motor 46 is determined based on the operating condition of the linear vibration motor 46, and a driving frequency of the linear vibration motor 46 is determined based on the determined motor output. Further, an amplitude-fixed AC voltage Vd having a frequency which is equal to the determined driving frequency is applied to the linear vibration motor 46.

As described above, in the linear compressor 40 according to the seventh embodiment, the motor output of the linear vibration motor 46 which is a power source of the linear compressor 40 is controlled by adjusting the frequency of the AC voltage that is applied to the linear vibration motor 46. Therefore, the output of the linear compressor 40 can be controlled without changing the level of the driving voltage which is applied to the linear vibration motor, whereby the output control is facilitated. Further, since the output of the linear compressor 40 is controlled by the driving frequency, the linear compressor can be operated with maximum performance without being restricted by its construction, whereby a design that provides maximum driving efficiency at rated performance can be carried out, similar to a compressor having a rotation-type motor as a driving source. As a result, a compact and efficient linear compressor is realized.

Eighth Embodiment

Figure 10:
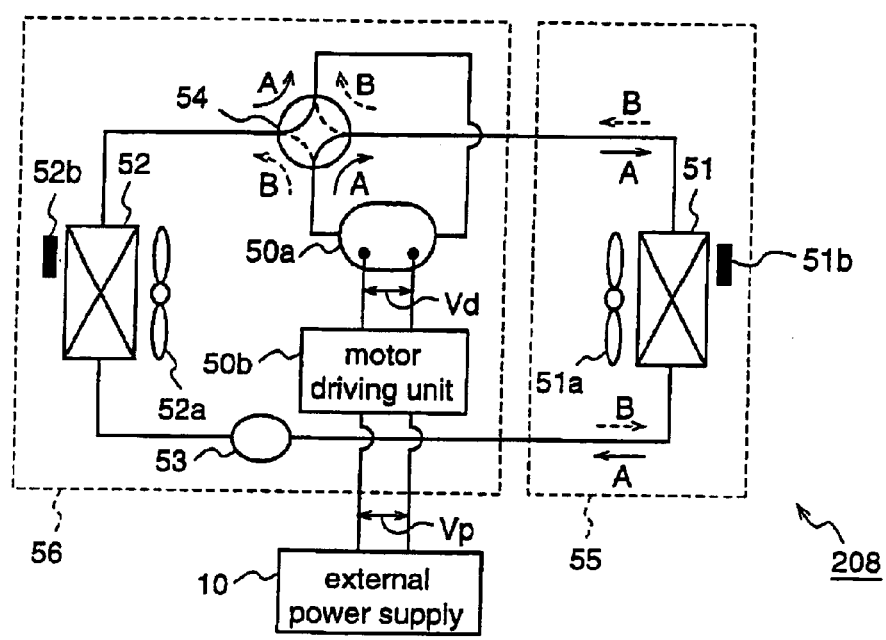
FIG. 10 is a schematic diagram for explaining an air conditioner according to an eighth embodiment of the present invention.

FIG. 10 is a block diagram for explaining an air conditioner according to an eighth embodiment of the present invention.

An air conditioner 208 according to the eighth embodiment has an indoor unit 55 and an outdoor unit 56, and performs cooling and heating. The air conditioner 208 comprises a linear compressor 50a for circulating a refrigerant between the indoor unit 55 and the outdoor unit 56, and a compressor driving unit 50b for driving the linear compressor 50a. The compressor 50a is identical to the linear compressor 40 having the linear vibration motor 46 according to the seventh embodiment. Further, the compressor driving unit 50b is a motor driving unit which converts the DC output voltage Vp from the external power supply 10 into the AC driving voltage Vd, and applies the AC driving voltage Vd to the linear vibration motor of the linear compressor 50a. The compressor driving unit 50b is identical in construction as the motor driving apparatus 207 according to the seventh embodiment.

More specifically, the air conditioner 208 has the linear compressor 50a for forming a refrigerant circulation path, a four-way valve 54, a throttle (expansion valve) 53, an indoor heat exchanger 51, an outdoor heat exchanger 52, and the motor driving unit 50b for driving the linear vibration motor as a driving source of the linear compressor 50a.

The indoor heat exchanger 51 constitutes the indoor unit 55, while the throttle 53, the outdoor heat exchanger 52, the linear compressor 50a, the four-way valve 54, and the motor driving unit 50b constitute the outdoor unit 52.

The indoor heat exchanger 51 has an air blower 51a for increasing the efficiency of heat exchange, and a temperature sensor 51b for measuring the temperature of the heat exchanger 51 or the ambient temperature thereof. The outdoor heat exchanger 52 has an air blower 52a for increasing the efficiency of heat exchange, and a temperature sensor 52b for measuring the temperature of the heat exchanger 52 or the ambient temperature thereof.

In this eighth embodiment, the linear compressor 50a and the four-way valve 54 are placed in the refrigerant path between the indoor heat exchanger 51 and the outdoor heat exchanger 52. That is, in this air conditioner 208, the four-way valve 54 switches between two states as follows: in the state where the refrigerant flows in the direction of arrow A, the refrigerant that has passed through the outdoor heat exchanger 52 is sucked into the linear compressor 50a, and the refrigerant that is discharged from the linear compressor 50a is supplied to the indoor heat exchanger 51; and in the state where the refrigerant flows in the direction of arrow B, the refrigerant that has passed through the indoor heat exchanger 51 is sucked into the linear compressor 50a, and the refrigerant that is discharged from the linear compressor 50a is supplied to the outdoor heat exchanger 52.

Further, the throttle 53 has both the function of reducing the flow rate of the circulating refrigerant, and the function as a valve for automatically controlling the flow rate of the refrigerant. That is, under the state where the refrigerant is circulating in the refrigerant circulation path, the throttle 53 reduces the flow rate of the fluid refrigerant which is outputted from a condenser to an evaporator so as to expand the fluid refrigerant, and supplies a proper amount of refrigerant that is required for the evaporator.

The indoor heat exchanger 51 operates as a condenser during heating and as an evaporator during cooling. The outdoor heat exchanger 52 operates as an evaporator during heating and as a condenser during cooling. In the condenser, the high-temperature and high-pressure refrigerant gas flowing therein loses heat to the air that is blown into the condenser, and gradually liquefies, thereby resulting in a high-pressure fluid refrigerant in the vicinity of the outlet of the condenser. This is equivalent to where the refrigerant radiates heat into the air to liquefy. Further, the fluid refrigerant whose temperature and pressure are reduced by the throttle 53 flows into the evaporator. When the indoor air is blown into the evaporator in this state, the fluid refrigerant takes a great amount of heat from the air and evaporates, thereby resulting in a low-temperature and low-pressure gas refrigerant. The air which has lost a great amount of heat in the evaporator is discharged as cool air from the blowoff port of the air conditioner.

In the air conditioner 208 according to the eighth embodiment, when the driving voltage Vd is supplied from the motor drive control unit 50b to the linear compressor 50a, the refrigerant circulates in the refrigerant circulation path, and heat exchange is carried out in the heat exchanger 51 of the indoor unit 55 and the heat exchanger 52 of the outdoor unit 56. That is, in the air conditioner 50, a well-known heat pump cycle is formed in the refrigerant circulation path by circulating the refrigerant that is sealed in the circulation path with the linear compressor 50a. Thereby, heating or cooling for a room is carried out.

For example, when the air conditioner 50 performs heating, the four-way valve 54 is set by a user operation so that the refrigerant flows in the direction of arrow A. In this case, the indoor heat exchanger 51 operates as a condenser, and discharges heat due to the circulation of the refrigerant in the refrigerant circulation path. Thereby, the room is heated.

Conversely, when the air conditioner 50 performs cooling, the four-way valve 54 is set by a user operation so that the refrigerant flows in the direction of arrow B. In this case, the indoor heat exchanger 51 operates as an evaporator, and absorbs heat from the ambient air due to the circulation of the refrigerant in the refrigerant circulation path. Thereby, the room is cooled.

In the air conditioner 208, the motor driving unit 50b controls the output of the linear vibration motor of the linear compressor 50a based on the target temperature set that is on the air conditioner and the actual room temperature and outdoor temperature. Thereby, the air conditioner 208 performs comfortable cooling and heating.

As described above, in the air conditioner 208 according to the eighth embodiment, since the compressor 50a having the linear vibration motor as a power source is used as the compressor for compressing and circulating a refrigerant, friction loss in the compressor is reduced as compared with an air conditioner using a compressor having a rotation-type motor as a power source. Furthermore, sealability of the compressor for sealing a high-pressure refrigerant and a low-pressure refrigerant is enhanced, thereby resulting in an increase in efficiency of the compressor.

Furthermore, in the compressor 50a using the linear vibration motor according to the eighth embodiment, since friction loss is reduced, the amount of use of lubricating oil that is indispensable in the compressor using the rotation-type motor can be significantly reduced. Thereby, the amount of waste oil that needs recycling or the like can be reduced, and the amount of refrigerant to be filled in the compressor can be reduced because the amount of refrigerant that dissolves into the oil is reduced, thereby resulting in a contribution to the conservation of the global environment.

Further, in the air conditioner 208, since the motor output of the linear vibration motor of the compressor is controlled by adjusting the frequency of the AC voltage which is applied to the linear vibration motor, the output of the linear compressor 50a can be controlled without changing the level of the driving voltage which is applied to the linear vibration motor, whereby performance control for the air conditioner is facilitated. Further, since the output of the linear compressor 50a is controlled by the driving frequency, the linear compressor can be operated with maximum performance without being restricted by its construction, whereby a design that provides maximum efficiency at rated performance can be carried out, as in the seventh embodiment. As a result, a compact and efficient linear compressor and, furthermore, a compact and efficient air conditioner are realized.

Ninth Embodiment

Figure 11:
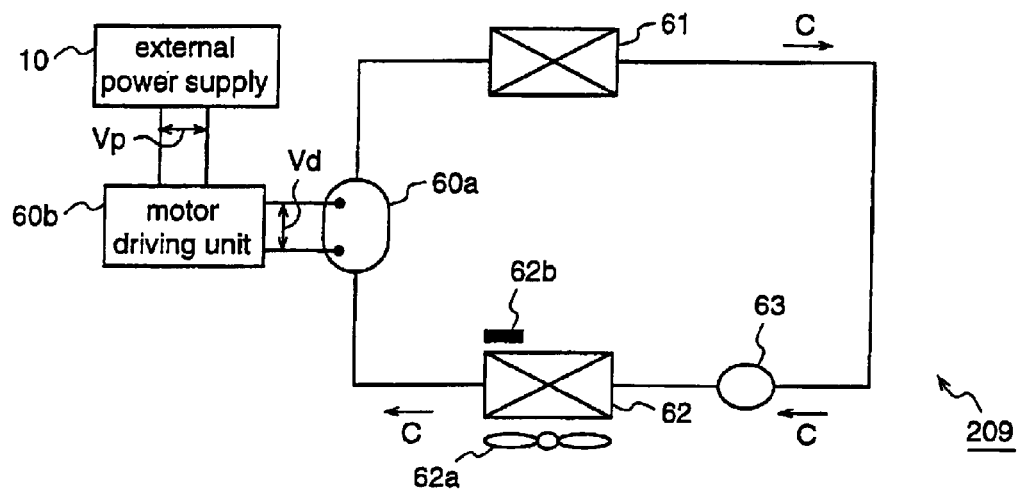
FIG. 11 is a schematic diagram for explaining a refrigerator according to a ninth embodiment of the present invention.

FIG. 11 is a block diagram for explaining a refrigerator according to a ninth embodiment of the present invention.

A refrigerator 209 of this ninth embodiment comprises a linear compressor 60a, a compressor driving unit 60b, a condenser 61, an evaporator 62, and a throttle 63.

The linear compressor 60a, the condenser 61, the throttle 63, and the evaporator 62 form a refrigerant circulation path, and the compressor driving unit 60b is a motor driving unit for driving a linear vibration motor as a driving source of the linear compressor 60a. The linear compressor 60a and the motor driving unit 60b are identical to the linear compressor 40 and the motor driving apparatus 207 according to the seventh embodiment, respectively.

Similar to the throttle 53 of the air conditioner 208 according to the eighth embodiment, the throttle 63 reduces the flow rate of the fluid refrigerant that is outputted from the condenser 61 so as to expand the fluid refrigerant, and supplies a proper amount of refrigerant to the evaporator 62, under the state where the refrigerant is circulating in the refrigerant circulation path.

The condenser 61 condenses the high-temperature and high-pressure refrigerant gas flowing therein, and discharges heat of the refrigerant to the outside air. The refrigerant gas that is introduced in the condenser 61 loses heat to the outside air and gradually liquefies, thereby resulting in a high-pressure fluid refrigerant in the vicinity of the outlet of the condenser.

The evaporator 62 evaporates the low-temperature refrigerant fluid to cool the inside of the refrigerator. The evaporator 62 has an air blower 62a for increasing the efficiency of heat exchange, and a temperature sensor 62b for detecting the temperature inside the refrigerator 209.

In the refrigerator 209, the motor driving unit 60b controls the output of the linear vibration motor of the linear compressor 60a based on the operating conditions of the refrigerator, i.e., the target temperature that is set on the refrigerator and the temperature inside the refrigerator.

The operation of the refrigerator 209 according to the ninth embodiment will now be described.

In the refrigerator 209, when a driving voltage Vd is supplied from the motor driving unit 60b to the linear vibration motor of the linear compressor 60a, the linear compressor 60a is operated and the refrigerant circulates in the refrigerant circulation path in the direction of arrow C. As a result, heat exchange is carried out in the condenser 61 and in the evaporator 62. Thus, the inside of the refrigerator is cooled.

To be specific, the refrigerant is liquefied in the condenser 61, and the flow rate of the refrigerant is reduced by the throttle 63 so as to expand the refrigerant, thereby resulting in a low-temperature fluid refrigerant. When the low-temperature fluid refrigerant is sent to the evaporator 62, the low-temperature fluid refrigerant is evaporated, whereby the inside of the refrigerator is cooled. At this time, the air in the refrigerator 209 is compulsorily sent to the evaporator 62 by the air blower 62a, whereby heat exchange is efficiently carried out in the evaporator 62.

Further, in the refrigerator 209, the motor driving unit 60b controls the output of the linear vibration motor of the linear compressor 60a based on the target temperature that is set on the refrigerator 209 and the temperature inside the refrigerator. Thereby, the temperature inside the refrigerator 209 is maintained at the target temperature.

As described above, in the refrigerator 209 according to the ninth embodiment, since the linear compressor 60a having the linear vibration motor as a power source is used as the compressor for compressing and circulating the refrigerant, friction loss in the compressor is reduced as compared with a refrigerator using a compressor having a rotation-type motor as a power source. Furthermore, sealability for sealing the refrigerant in the compressor is enhanced, thereby resulting in an increase in operation efficiency of the compressor.

Furthermore, in the refrigerator 209, since friction loss in the compressor is reduced, the amount of waste oil (spent lubricating oil) and the amount of refrigerant to be filled in the compressor are reduced, as in the air conditioner 208 of the eighth embodiment. Therefore, the refrigerator 209 can contribute to the conservation of the global environment.

Moreover, in the air conditioner 209, since the motor output of the linear vibration motor of the compressor is controlled by adjusting the frequency of the AC voltage which is applied to the linear vibration motor, the output of the linear compressor 60a can be controlled without changing the level of the driving voltage thereof as in the eighth embodiment, whereby performance control for the refrigerator is facilitated. Further, since the output of the linear compressor 60a is controlled by adjusting the driving frequency, the linear compressor can be operated with maximum performance without being restricted by its construction, whereby a design that provides maximum efficiency at rated performance can be carried out as in the seventh embodiment. As a result, a compact and efficient linear compressor and, furthermore, a compact and efficient refrigerator are realized.

Tenth Embodiment

Figure 12:
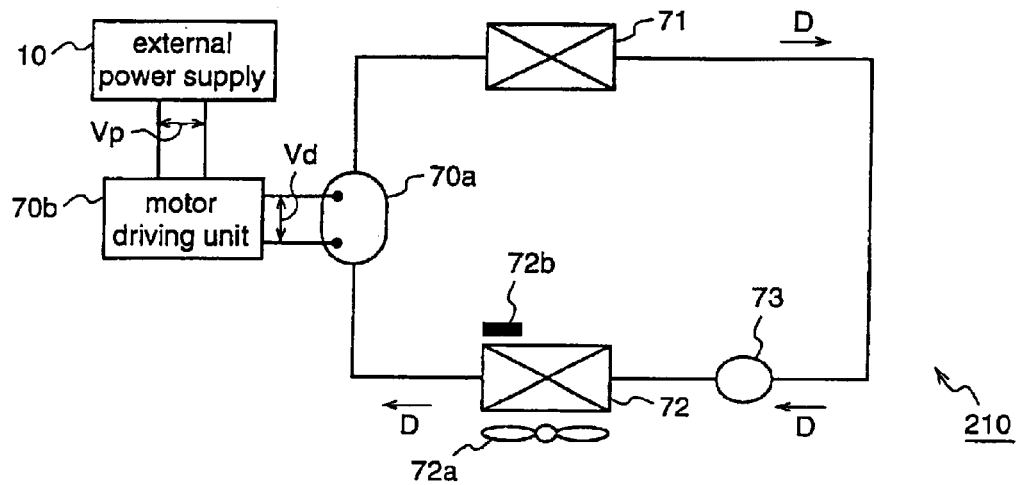
FIG. 12 is a schematic diagram for explaining a cryogenic freezer according to a tenth embodiment of the present invention.

FIG. 12 is a block diagram for explaining a cryogenic freezer according to a tenth embodiment of the present invention.

A cryogenic freezer 210 according to the tenth embodiment has a freezing chamber (not shown), and cools the inside of the chamber at a cryogenic temperature (lower than −50□). As for objects to be frozen by the cryogenic freezer 210, there are electromagnetic circuit elements such as resistors, coils, magnets to be used as superconducting elements, electronic elements such as low-temperature reference parts for infrared sensors, medical objects such as blood and viscera, and foods such as tunas.

Electronic elements are preserved in the cryogenic states so as to increase their operating efficiencies or to increase their sensitivities by removing thermal noises. As for foods, perishable foods are preserved in the cryogenic states to facilitate transportation, maintain freshness, or perform freeze-dry.

Although the freezing temperature of the cryogenic freezer 210 varies with applications, it is lower than −50□ and, especially in applications for superconducting, the temperature varies over a wide range of 0–100K (Kelvin). For example, the freezing temperature of the cryogenic freezer 210 is set at about 50–100K in applications for high-temperature superconducting, and at about 0–50K in applications for normal superconducting. Further, when the cryogenic freezer 210 is used for maintaining the freshness of foods or the like, the freezing temperature is set at a little under −50□.

Hereinafter, the cryogenic freezer 210 will be described in detail.

The cryogenic freezer 210 comprises a linear compressor 70a, a compressor driving unit 70b, a heat radiator 71, a heat storage 72, and a throttle 73.

The linear compressor 70a, the heat radiator 71, the throttle 73, and the heat storage 72 form a refrigerant circulation path. The compressor driving unit 70b is a motor driving unit for driving and controlling a linear vibration motor as a driving source of the linear compressor 70a. The linear compressor 70a and the motor driving unit 70b are identical to the linear compressor 40 and the motor driving apparatus 207 according to the seventh embodiment, respectively.

The throttle 73 reduces the fluid refrigerant that is sent from the heat radiator 71 to the heat storage 72 so as to expand the refrigerant, similar to the throttle 53 of the eighth embodiment.

The heat radiator 71 condenses the high-temperature and high-pressure refrigerant gas flowing therein, and discharges heat of the refrigerant to the outside air, similar to the condenser 61 of the refrigerator 209 of the ninth embodiment.

The heat storage 72 evaporates the low-temperature refrigerant fluid to cool the inside of the freezing chamber, thereby to preserve the objects at the cryogenic temperature, similar to the evaporator 62 of the ninth embodiment. The heat storage 72 has a temperature sensor 72b for detecting the temperature of the objects. The heat storage 72 may have an air blower 72a for increasing the efficiency of heat exchange as shown in FIG. 12.

In the cryogenic freezer 210, the motor driving unit 70b controls the output of the linear vibration motor of the linear compressor 70a based on the operating conditions of the cryogenic freezer 210, i.e., the target temperature set on the cryogenic freezer 210 and the temperature of the objects to be frozen.

In the cryogenic freezer 210, when an AC voltage Vd is supplied from the motor driving unit 70b to the linear vibration motor of the linear compressor 70a, the linear compressor 70a is operated, and the refrigerant circulates in the refrigerant circulation path in the direction of arrow D, whereby heat exchange is carried out in the heat radiator 71 and the heat storage 72. Thereby, the inside of the freezing chamber is cooled, and the objects in the chamber are frozen.

That is, the refrigerant is liquefied in the heat radiator 71, and the flow rate of the refrigerant is reduced by the throttle 73 so as to expand the refrigerant, thereby resulting in a low-temperature fluid refrigerant. When the low-temperature fluid refrigerant is sent to the heat storage 72, the fluid refrigerant is evaporated, whereby the freezing chamber is cooled.

Further, in the cryogenic freezer 210, the motor driving unit 70b controls the output of the linear vibration motor of the linear compressor 70a based on the target temperature that is set on the cryogenic freezer 210 and the temperature of the object to be frozen. Thereby, in the cryogenic freezer 210, the temperature of the object to be frozen is maintained at the target temperature.

As described above, in the cryogenic freezer 210 according to the tenth embodiment, since the linear compressor 70a having the linear vibration motor as a power source is used as the compressor for compressing and circulating the refrigerant, friction loss in the compressor is reduced as compared with a cryogenic freezer using a compressor having a rotation-type motor as a power source. Furthermore, sealability for sealing the refrigerant in the compressor is enhanced, thereby resulting in an increase in operation efficiency of the compressor.

Furthermore, in the cryogenic freezer 210, since friction loss in the compressor is reduced, the amount of waste oil (spent lubricating oil) and the amount of refrigerant to be filled in the compressor can be reduced, as in the air conditioner 208 of the eighth embodiment. Therefore, the freezer 210 can contribute to the conservation of the global environment.

Moreover, in the cryogenic freezer 210, since the output of the linear vibration motor of the compressor is controlled by adjusting the frequency of the AC voltage which is applied to the linear vibration motor, the output of the linear compressor 70a can be controlled without changing the level of the driving voltage thereof as in the eighth embodiment, whereby performance control for the cryogenic freezer 210 is facilitated. Further, since the output of the linear compressor 70a is controlled by adjusting the driving frequency, the linear compressor can be operated with maximum performance without being restricted by its construction, whereby a design that provides maximum efficiency at rated performance can be carried out, as in the seventh embodiment. As a result, a compact and efficient linear compressor and, furthermore, a compact and efficient cryogenic freezer are realized.

Eleventh Embodiment

Figure 13:
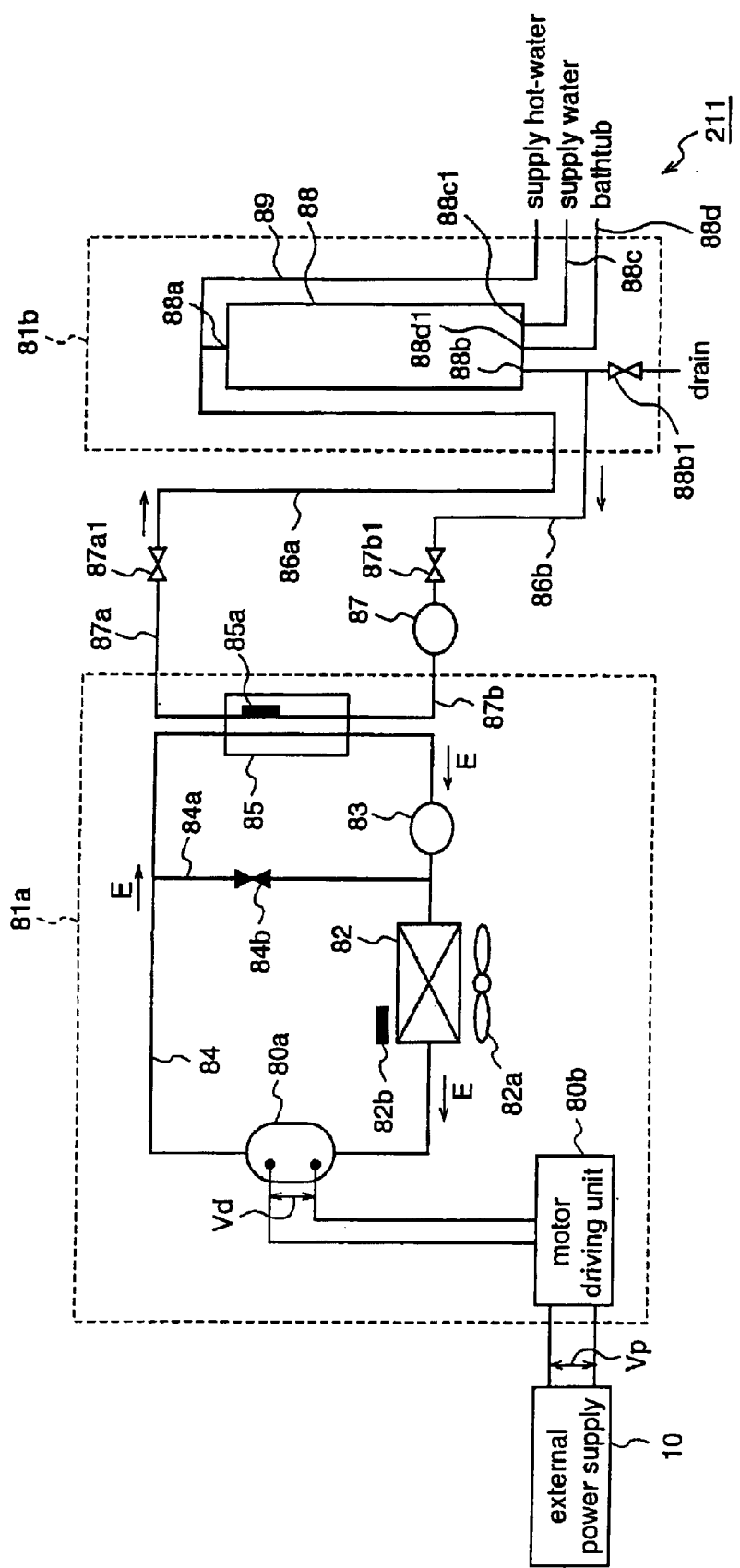
FIG. 13 is a schematic diagram for explaining a hot-water supply unit according to an eleventh embodiment of the present invention.

FIG. 13 is a block diagram for explaining a hot-water supply unit according to an eleventh embodiment of the present invention.

A hot-water supply unit 211 according to the eleventh embodiment has a refrigeration cycle unit 81a for heating supplied water so as to discharge hot water, a hot-water storage 81b in which the hot water that is discharged from the refrigeration cycle unit 81a is stored, and pipes 86a, 86b, 87a, and 87b connecting the unit 81a and the storage 81b.

The refrigeration cycle unit 81a has a linear compressor 80a, a compressor driving unit 80b, an air-refrigerant heat exchanger 82, a throttle 83, and a water-refrigerant heat exchanger 85.

The linear compressor 80a, the air-refrigerant heat exchanger 82, the throttle 83, and the water-refrigerant heat exchanger 85 form a refrigerant circulation path.

The compressor driving unit 80b drives a linear vibration motor (not shown) as a driving source of the linear compressor 80a. The linear compressor 80a is identical to the linear compressor 40 having the linear vibration motor 46 according to the seventh embodiment. Further, the compressor driving unit 80b is supplied with a DC voltage Vp from an external power supply 10, and the compressor driving unit 80b is identical in construction to the motor driving apparatus 207 of the seventh embodiment. Hereinafter, the compressor driving unit 80b is referred to as a motor driving unit 80b in this eleventh embodiment.

The throttle 83 reduces the flow rate of the fluid refrigerant that is sent from the water-refrigerant heat exchanger 85 to the air-refrigerant heat exchanger 82 so as to expand the fluid refrigerant.

The water-refrigerant heat exchanger 85 is a condenser for heating up the water that is supplied to the refrigeration cycle unit 81a, and has a temperature sensor 85a for detecting the temperature of the heated water. The air-refrigerant heat exchanger 82 is an evaporator for absorbing heat from the ambient atmosphere, and has an air blower 82a for increasing the efficiency of heat exchange and a temperature sensor 82b for detecting the ambient temperature.

In FIG. 13, reference numeral 84 denotes a refrigerant pipe for circulating the refrigerant along the refrigerant circulation path that is formed by the linear compressor 80a, the water-refrigerant heat exchanger 85, the throttle 83, and the air-refrigerant heat exchanger 82. A defrost bypass pipe 84a for supplying the refrigerant that is discharged from the linear compressor 80a to the air-refrigerant heat exchanger 82, bypassing the water-refrigerant heat exchanger 85 and the throttle 83, is connected to the refrigerant pipe 84, and a defrost bypass valve 84b is provided in a portion of the bypass pipe 84a.

The hot-water storage 81b has a hot-water storage tank 88 for storing water or hot water. A water supply pipe 88c for supplying water from the outside to the storage tank 88 is connected to a water intake port 88c1 of the storage tank 88, and a hot-water supply pipe 88d for supplying hot-water from the storage tank 88 to a bathtub is connected to a hot-water discharge port 88d1 of the storage tank 88. Further, a hot-water supply pipe 89 for supplying the hot water stored in the storage tank 88 to the outside is connected to a water intake/discharge port 88a of the storage tank 88.

The storage tank 88 and the water-refrigerant heat exchanger 85 of the refrigeration cycle unit 81a are connected by pipes 86a, 86b, 87a, and 87b, and a water circulation path is formed between the storage tank 88 and the water-refrigerant heat exchanger 85.

The water supply pipe 86b is a pipe for supplying water from the storage tank 88 to the water-refrigerant heat exchanger 85, and an end of this pipe is connected to a water discharge port 88b of the storage tank 88 while the other end is connected to a water intake side pipe 87b of the water-refrigerant heat exchanger 85 through a joint 87b1. Further, a discharge valve 88b1 for discharging the water or hot water that is stored in the storage tank 88 is fixed to an end of the water supply pipe 86b. The water supply pipe 86a is a pipe for returning the water from the water-refrigerant heat exchanger 85 to the storage tank 88, and an end of this pipe is connected to the water intake/discharge port 88a of the storage tank 88 while the other end is connected to a discharge side pipe 87a of the water-refrigerant heat exchanger 85 through a joint 87a1.

A pump 87 for circulating the water in the water circulation path is provided in a portion of the water intake side pipe 87b of the water-refrigerant heat exchanger 85.

Further, in the hot-water supply unit 211, the motor driving unit 80b determines a motor output which is required of the linear vibration motor of the linear compressor 80a based on the operating conditions of the hot-water supply unit, i.e., the target temperature of the hot water that is set on the hot-water supply unit, the temperature of the water that is supplied from the hot-water storage 81b to the water-refrigerant heat exchanger 85 of the refrigeration cycle unit 81a, and the outdoor temperature.

The operation of the hot-water supply unit according to the eleventh embodiment will now be described.

When an AC voltage Vd from the motor driving unit 80b is applied to the linear vibration motor (not shown) of the linear compressor 80a to operate the linear compressor 80a, the high-temperature refrigerant that is compressed by the linear compressor 80a circulates in the direction of arrow E, i.e., the high-temperature refrigerant passes through the refrigerant pipe 84, to be supplied to the water-refrigerant heat exchanger 85. Further, when the pump 87 in the water circulation path is driven, water is supplied from the storage tank 88 to the water-refrigerant heat exchanger 85.

In the water-refrigerant heat exchanger 85, heat exchange is carried out between the refrigerant and the water that is supplied from the storage tank 88, whereby heat moves from the refrigerant to the water. That is, the supplied water is heated, and the heated water is supplied to the storage tank 88. At this time, the temperature of the heated water is observed by the condensation temperature sensor 85a.

Further, in the water-refrigerant heat exchanger 85, the refrigerant is condensed by the above-mentioned heat exchange, and the flow rate of the condensed fluid refrigerant is reduced by the throttle 83, whereby the refrigerant is expanded and sent to the air-refrigerant heat exchanger 82. In the hot-water supply unit 211, the air-refrigerant heat exchanger 82 serves as an evaporator. That is, the air-refrigerant heat exchanger 82 absorbs heat from the outside air that is sent by the air blower 82b, thereby to evaporate the low-temperature fluid refrigerant. At this time, the temperature of the ambient atmosphere of the air-refrigerant heat exchanger 82 is observed by the temperature sensor 82b.

Further, in the refrigeration cycle unit 81a, when the air-refrigerant heat exchanger 82 is frosted, the defrost bypass valve 84b opens, and the high-temperature refrigerant is supplied to the air-refrigerant heat exchanger 82 through the defrost bypass line 84a. Thereby, the air-refrigerant heat exchanger 82 is defrosted.

On the other hand, the hot water is supplied from the water-refrigerant heat exchanger 85 of the refrigeration cycle unit 81a to the hot-water storage 81b through the pipes 87a and 86a, and the supplied hot water is stored in the storage tank 88. The hot water in the storage tank 88 is supplied to the outside through the hot-water supply pipe 89 as required. Especially when the hot water is supplied to a bathtub, the hot water in the storage tank 88 is supplied to the bathtub through a hot-water supply pipe 88d for the bathtub.

Further, when the amount of water or hot water that is stored in the storage tank 88 becomes lower than a predetermined amount, water is supplied from the outside through the water supply pipe 88c.

As described above, in the hot-water supply unit 211 according to the eleventh embodiment, since the linear compressor 80a having the linear vibration motor as a power source is used as the compressor for compressing and circulating the refrigerant in the refrigeration cycle unit 81a, friction loss in the compressor is reduced as compared with a hot-water supply unit using a compressor having a rotation-type motor as a power source. Furthermore, sealability for sealing the refrigerant in the compressor is enhanced, thereby resulting an increase in operation efficiency of the compressor.

Furthermore, in the hot-water supply unit 211, since friction loss in the compressor is reduced, the amount of waste oil (spent lubricating oil) and the amount of refrigerant to be filled in the compressor can be reduced, as in the air conditioner 208 of the eighth embodiment. Therefore, the hot-water supply unit 211 can contribute to the conservation of the global environment.

Moreover, in the hot-water supply unit 211, since the output of the linear vibration motor of the compressor is controlled by adjusting the frequency of the AC voltage which is applied to the linear vibration motor, the output of the linear compressor 80a can be controlled without changing the level of the driving voltage thereof as in the eighth embodiment, whereby performance control for the hot-water supply unit 211 is facilitated. Further, since the output of the linear compressor 80a is controlled by adjusting the driving frequency, the linear compressor can be operated with maximum performance without being restricted by its construction, whereby a design that provides maximum efficiency at rated performance can be carried out, as in the seventh embodiment. As a result, a compact and efficient linear compressor and, furthermore, a compact and efficient hot-water supply unit are realized.

Twelfth Embodiment

Figure 14:
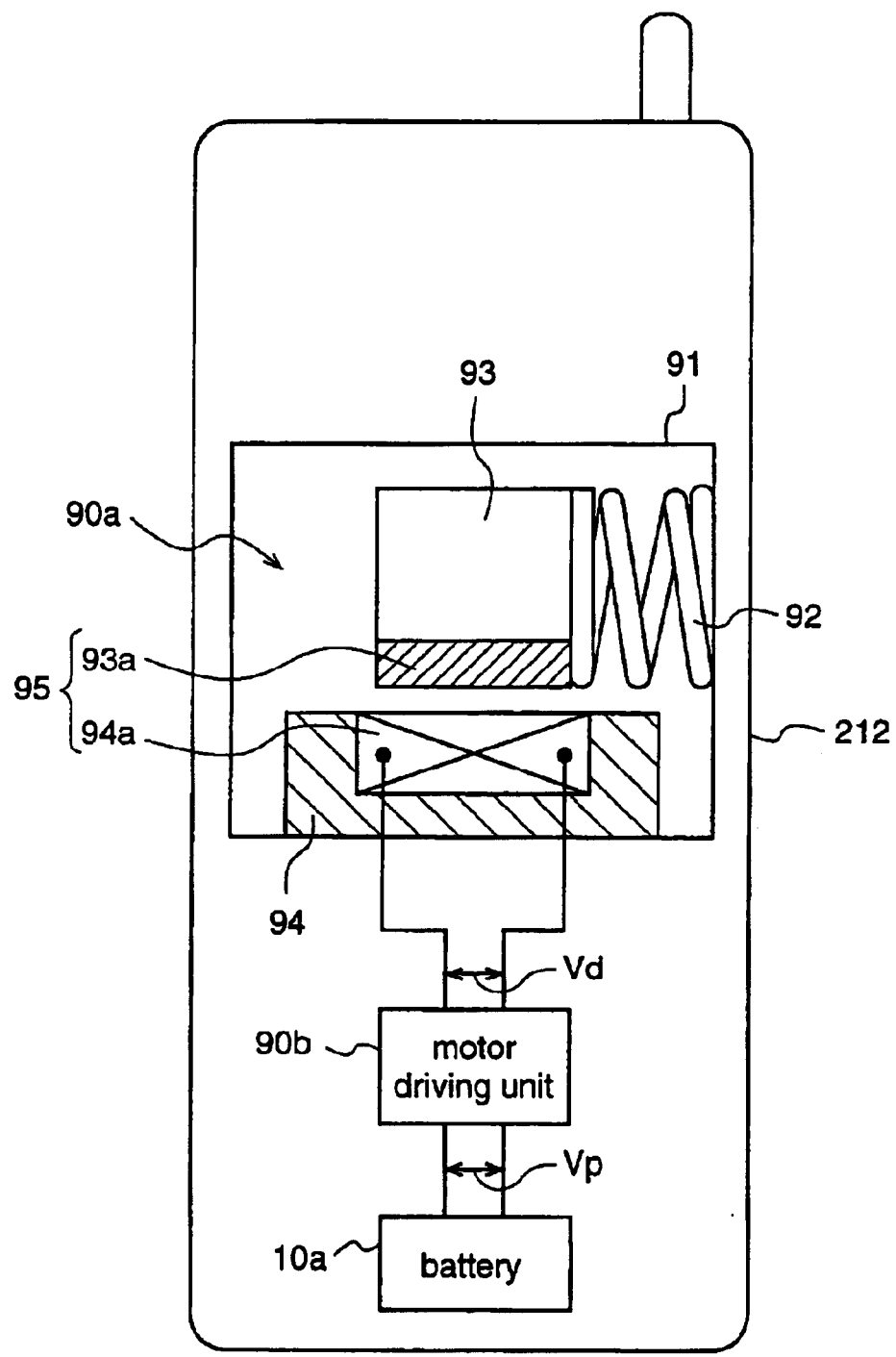
FIG. 14 is a schematic diagram for explaining a handy phone according to a twelfth embodiment of the present invention.

FIG. 14 is a block diagram for explaining a handy phone according to a twelfth embodiment of the present invention.

A handy phone 212 of this twelfth embodiment has a vibrator 90a that mechanically vibrates, and a driving unit 90b for driving the vibrator 90a. The handy phone 212 informs a user of an incoming call or the like by vibration.

The vibrator 90a is provided with a weight member 93 that is placed in a case 91 and is vibratably supported by a spring member 92, a magnet 93a which is fixed to a portion of the weight member 93, and a stator 94 in which a coil 94a is embedded, which stator 94 is placed in the case 91 to be opposed to the magnet 93a of the weight member 93. A linear vibration motor 95 is constituted by the magnet 93a which is fixed to the weight member 93, and the coil 94a that is embedded in the stator 94. In this linear vibration motor 95, the weight member 93 reciprocates in the expansion direction of the spring member 92 due to an electromagnetic power that is generated between the coil 94a and the magnet 93a, and the elasticity of the spring member 92.

The driving unit 90b converts an output voltage Vp of a battery 10a which is incorporated in the handy phone 212 into an AC voltage Vd, and supplies the AC voltage Vd as a driving voltage to the linear vibration motor 95 of the vibrator 90a. Hereinafter, the driving unit 90b is referred to as a motor driving unit 90b in this twelfth embodiment. The motor driving unit 90b has a motor driver 1, a driving frequency determining unit 2, and an order output determining unit 3 shown in FIG. 1, similar to the motor driving apparatus 101 according to the first embodiment. Further, the motor driving unit 90b controls a motor output which is required of the linear vibration motor 95 by adjusting the frequency of the AC driving voltage Vd that is applied to the linear vibration motor 95, similar to the motor driving apparatus 101 according to the first embodiment.

In the handy phone 212 so constructed, when receiving a call, power is supplied from the motor drive control unit 90b to the linear vibration motor 95 of the vibrator 90a, whereby the weight member 93 reciprocates in the expansion direction of the spring member 92, and the vibrator 90a vibrates.

That is, when the AC voltage Vd is applied to the coil 94a, an AC magnetic field is generated in the stator 94, and the magnetic field attracts the magnet 93a, whereby the magnet 93a and the weight member 93 to which the magnet 93a is fixed start to reciprocate.

Under the state where the vibrator 90a is operating, a motor output which is required of the linear vibration motor 95 is determined based on the operating condition of the linear vibration motor 95, and a driving frequency of the linear vibration motor 95 is determined based on the determined motor output. Further, the amplitude-fixed AC voltage Vd having a frequency which is equal to the determined driving frequency is applied to the linear vibration motor 95.

Thereby, in the handy phone 212, the magnitude of vibration at the reception of an incoming call is controlled as a required pattern, and the incoming call is informed to the user by vibration of the pattern according to user preference or the like.

As described above, in the handy phone 212 according to the twelfth embodiment, since mechanical vibration is generated by the linear vibration motor 95, the mechanical vibration can be varied with two degrees of freedom, i.e., the number of vibrations and the amplitude, as compared with the case where vibration is generated by a rotation-type motor, whereby the vibrator 91 which informs an incoming call or the like to the user by vibration can be provided with a variety of vibration patterns.

Further, in the handy phone 212 of the twelfth embodiment, since the motor output of the linear vibration motor as a power source of the vibration unit 90a is controlled by adjusting the frequency of the AC voltage which is applied to the linear vibration motor, the motor output can be controlled with the level of the driving voltage of the linear vibration motor being kept constant, whereby the magnitude of vibration of the handy phone can be easily controlled. Further, since the output of the linear vibration motor 95 is controlled by adjusting the driving frequency, the linear vibration motor 95 can be operated at the maximum performance without being restricted by its construction, thereby generating more powerful vibration.

While in this twelfth embodiment the linear vibration motor and the driving apparatus thereof according to the first embodiment are used as a vibrator for informing a user of an incoming call in a handy phone and a driving apparatus thereof, respectively, the linear vibration motor and the driving apparatus according to the first embodiment may be used as a power source of a reciprocation-type electric razor and a driving apparatus thereof, respectively.

Moreover, while in the seventh to twelfth embodiments the motor driving units have the same construction as the motor driving apparatus 101 of the first embodiment, the motor driving units may have the same construction as any of the motor driving apparatuses 102–106 according to the second to sixth embodiments.

APPLICABILITY IN INDUSTRY

A motor driving apparatus according to the present invention controls at least one of an output of a linear vibration motor and a stroke of a mover based on a frequency of an AC current which is applied to the linear vibration motor, whereby the linear vibration motor can be operated at maximum output without being restricted by its construction, thereby resulting in maximum efficiency at rated output.

What is claimed is:

1. A motor driving apparatus for driving a linear vibration motor having a reciprocatable mover and a spring member which supports the mover, said motor driving apparatus comprising:

a driving frequency determining unit operable to determine a driving frequency of the linear vibration motor;

a position detection unit operable to detect a position of the mover; and a motor driver operable to supply an AC voltage as a driving voltage to the linear vibration motor;

wherein said driving frequency determining unit is operable to set the driving frequency at a resonance frequency which brings a spring vibration system including the mover into a resonance state when the position of the mover detected by said position detection unit does not exceed a predetermined reference position, and to set the driving frequency at a frequency which is higher than the resonance frequency when the position of the mover detected by said position detection unit exceeds the reference position;

wherein said motor driver is operable to control at least one of a motor output of the linear vibration motor and a stroke of the mover by adjusting a frequency of the AC voltage; and wherein said motor driver is operable to control the stroke of the mover by adjusting the frequency of the AC voltage supplied to the linear vibration motor so as to be equal to the driving frequency determined by said driving frequency determining unit.

2. A motor driving apparatus as defined in claim 1, wherein said driving frequency determining unit is operable to change the driving frequency to a frequency at which the position of the mover detected by said position detection unit does not exceed the reference position when the position of the mover detected by said position detection unit exceeds the reference position.

3. A motor driving apparatus as defined in claim 1, further comprising:
   a target output determining unit operable to determine a target output as a motor output which is required of the linear vibration motor;
   an output detection unit operable to detect the motor output of the linear vibration motor; and
   a driving voltage determining unit operable to determine a target voltage value of the driving voltage of the linear vibration motor so that a difference between the motor output detected by said output detection unit and the target output determined by said target output determining unit becomes zero;
   wherein said motor driver is operable to adjust the frequency and voltage value of the AC voltage supplied to the linear vibration motor so that the voltage value of the AC voltage becomes equal to the target voltage value determined by said driving voltage determining unit, and the frequency of the AC voltage becomes equal to the driving frequency determined by said driving frequency determining unit.

4. A motor driving apparatus as defined in any one of claims 1 to 3, wherein the reference position is determined based on an elastic limit value of the spring member supporting the mover.

5. A motor driving apparatus as defined in any one of claims 1 to 3, wherein the reference position is determined based on a position in which the mover might collide with parts constituting the linear vibration motor, or based on a position in which the mover might collide with parts of a device containing the linear vibration motor.

6. A motor driving apparatus for driving a linear vibration motor having a reciprocatable mover and a spring member which supports the mover, said motor driving apparatus comprising:
   a driving frequency determining unit operable to determine a driving frequency of the linear vibration motor;
   a target output determining unit operable to determine a target output as a motor output which is required of the linear vibration motor;
   an output detection unit operable to detect a motor output of the linear vibration motor;
   a driving voltage determining unit operable to determine a target voltage value of the driving voltage of the linear vibration motor so that a difference between the motor output detected by said output detection unit and the target output determined by said target output determining unit becomes zero; and a motor driver operable to supply an AC voltage as a driving voltage to the linear vibration motor;
   wherein said driving frequency determining unit is operable to set the driving frequency at a resonance frequency which brings a spring vibration system including the mover into a resonance state when the target voltage value determined by said driving voltage determining unit does not exceed a predetermined reference value, and to set the driving frequency at a frequency which is higher than the resonance frequency when the target voltage value determined by said driving voltage determining unit exceeds the reference value; and
   wherein said motor driver is operable to control the motor output and a stroke of the mover by adjusting the frequency and voltage value of the AC voltage supplied to the linear vibration motor so that the voltage value of the AC voltage becomes equal to the target voltage value determined by said driving voltage determining unit, and the frequency of the AC voltage becomes equal to the driving frequency determined by said driving frequency determining unit.

7. A motor driving apparatus as defined in claim 6, wherein:
   the reference value is determined based on the basis of the voltage value of a DC power supply which is provided for said motor driver; and
   said driving frequency determining unit is operable to change the driving frequency to a frequency at which the target voltage value determined by said driving voltage determining unit does not exceed the reference value when the target voltage value determined by said driving voltage determining unit exceeds the reference value.

8. A motor driving apparatus for driving a linear vibration motor having a reciprocatable mover and a spring member which supports the mover, said motor driving apparatus comprising:
   a driving frequency determining unit operable to determine a driving frequency of the linear vibration motor;
   a target output determining unit operable to determine a target output as a motor output which is required of the linear vibration motor;
   an output detection unit operable to detect a motor output of the linear vibration motor;
   a driving voltage determining unit operable to determine a target voltage value of the driving voltage of the linear vibration motor so that a difference between the motor output detected by said output detection unit and the target output determined by said target output determining unit becomes zero;
   a driving voltage detection unit operable to detect an actual voltage value of the driving voltage of the linear vibration motor; and
   a motor driver operable to supply an AC voltage as the driving voltage to the linear vibration motor;
   wherein said driving frequency determining unit is operable to set the driving frequency at a resonance frequency which brings a spring vibration system including the mover into a resonance state when the actual voltage value detected by said driving voltage detection unit does not exceed a reference value that is determined based on the voltage value of a DC voltage which is supplied to the motor driver, and to set the driving frequency at a frequency which is higher than the resonance frequency when the actual voltage value detected by said driving voltage detection unit exceeds the reference value; and wherein said motor driver is operable to control the motor output and stroke of the mover by adjusting the frequency and voltage value of the AC voltage supplied to the linear vibration motor so that the voltage value of the AC voltage becomes equal to the target voltage value determined by said driving voltage determining unit, and the frequency of the AC voltage becomes equal to the driving frequency determined by driving frequency determining unit.

9. A motor driving apparatus for driving a linear vibration motor including a mover and a spring member which supports the mover, said motor driving apparatus comprising:

a driving frequency determining unit operable to determine a driving frequency of the linear vibration motor; and a motor driver operable to supply an AC voltage as a driving voltage to the linear vibration motor;

wherein said driving frequency determining unit is operable to switch the driving frequency of the linear vibration motor between a resonance frequency and a frequency other than the resonance frequency based on an operation condition of the linear vibration motor; and wherein said motor driver is operable to control at least one of a motor output of the linear vibration motor and a stroke of the mover by adjusting a frequency of the AC voltage based on the driving frequency determined by said frequency determining unit.

10. A motor driving apparatus as defined in claim 9, further comprising a target output determining unit operable to determine a target output as a motor output which is required of the linear vibration motor;

wherein said driving frequency determining unit is operable to determine the driving frequency of the linear vibration motor based on the target output determined by said target output determining unit; and wherein said motor driver is operable to control the motor output by adjusting the frequency of the AC voltage supplied to the linear vibration motor so as to be equal to the driving frequency determined by said driving frequency determining unit.

11. A motor driving apparatus as defined in claim 10, further comprising an output detection unit operable to detect the motor output of the linear vibration motor;

wherein said driving frequency determining unit is operable to determine the driving frequency of the linear vibration motor so that a difference between the motor output detected by said output detection unit and the target output determined by said target output determining unit becomes zero.

12. A motor driving apparatus as defined in claim 9, further comprising a position detection unit operable to detect a position of the mover;

wherein said driving frequency determining unit is operable to set the driving frequency at a resonance frequency which brings a spring vibration system including the mover into a resonance state when the position of the mover detected by said position detection unit does not exceed a predetermined reference position, and to set the driving frequency at a frequency which is higher than the resonance frequency when the position of the mover detected by said position detection unit exceeds the reference position; and wherein said motor driver is operable to control the stroke of the mover by adjusting the frequency of the AC voltage supplied to the linear vibration motor so as to be equal to the driving frequency determined by said driving frequency determining unit.

13. A motor driving apparatus as defined in claim 12, wherein said driving frequency determining unit is operable to change the driving frequency at which the position of the mover detected by said position detection unit does not exceed the reference position when the position of the mover detected by said position detection unit exceeds the reference position.

14. A motor driving apparatus as defined in claim 12, further comprising:

a target output determining unit operable to determine a target output as a motor output which is required of the linear vibration motor;

an output detection unit operable to detect the motor output of the linear vibration motor; and a driving voltage determining unit operable to determine a target voltage value of the driving voltage of the linear vibration motor so that a difference between the motor output detected by said output detection unit and the target output determined by said target output determining unit becomes zero;

wherein said motor driver is operable to adjust the frequency and voltage value of the AC voltage supplied to the linear vibration motor so that the voltage value of the AC voltage becomes equal to the target value determined by said driving voltage determining unit, and the frequency of the AC voltage becomes equal to the driving frequency determined by said driving frequency determining unit.

15. A motor driving apparatus as defined in claim 12, wherein the reference position is determined based on an elastic limit value of the spring member supporting the mover.

16. A motor driving apparatus as defined in claim 12, wherein the reference position is determined based on a position in which the mover might collide with parts constituting the linear vibration motor, or based on a position in which the mover might collide with parts of a device containing the linear vibration motor.

17. A motor driving apparatus as defined in claim 9, further comprising:

a target output determining unit operable to determine a target output as a motor output which is required of the linear vibration motor;

an output detection unit operable to detect the motor output of the linear vibration motor;

a driving voltage determining unit operable to determine a target voltage value of the driving voltage of the linear vibration motor so that a difference between the motor output detected by said output detection unit and the target output determined by said target output determining unit becomes zero; and a motor driver operable to supply an AC voltage as a driving voltage to the linear vibration motor;

wherein said driving frequency determining unit is operable to set the driving frequency at a resonance frequency which brings a spring vibration system including the mover into a resonance state when the target voltage value determined by said driving voltage determining unit does not exceed a predetermined reference value, and to set the driving frequency at a frequency which is higher than the resonance frequency when the target voltage value determined by said driving voltage determining unit exceeds the reference value; and wherein said motor driver is operable to control the motor output and the stroke of the mover by adjusting the frequency and voltage value of the AC voltage supplied to the linear vibration motor so that the voltage value of the AC voltage becomes equal to the target voltage value determined by said driving voltage determining unit, and the frequency of the AC voltage becomes equal to the driving frequency determined by said driving frequency determining unit.

18. A motor driving apparatus as defined in claim 17, wherein:
   the reference value is determined based on the voltage value of a DC power supply which is provided for said motor driver; and
   said driving frequency determining unit is operable to change the driving frequency to a frequency at which the target voltage value determined by said driving voltage determining unit does not exceed the reference value when the target voltage value determined by said driving voltage determining unit exceeds the reference value.

19. A motor driving apparatus as defined in claim 9, further comprising:
   a target output determining unit operable to determine a target output as a motor output which is required of the linear vibration motor;
   an output detection unit operable to detect the motor output of the linear vibration motor;
   a driving voltage determining unit operable to determine a target voltage value of the driving voltage of the linear vibration motor so that a difference between the motor output detected by said output detection unit and the target output determined by said target output determining unit becomes zero;
   a driving voltage detection unit operable to detect an actual voltage value of the driving voltage of the linear vibration motor; and
   a motor driver operable to supply an AC voltage as the driving voltage to the linear vibration motor;
   wherein said driving frequency determining unit is operable to set the driving frequency at a resonance frequency which brings a spring vibration system including the mover into a resonance state when the actual voltage value detected by said driving voltage detection unit does not exceed a reference value that is determined based on the voltage value of a DC voltage which is supplied to the motor driver, and to set the driving frequency at a frequency which is higher than the resonance frequency when the actual voltage value detected by said driving voltage detection unit exceeds the reference value; and
   wherein said motor driver is operable to control the motor output and the stroke of the mover by adjusting the frequency and voltage value of the AC voltage supplied to the linear vibration motor so that the voltage value of the AC voltage becomes equal to the target voltage value determined by said driving voltage determining unit, and the frequency of the AC voltage becomes equal to the driving frequency determined by said driving frequency determining unit.

20. An air conditioner provided with a compressor which has a cylinder and a piston, said compressor being operable to compress a fluid in the cylinder by a reciprocating motion of the piston, said air conditioner comprising:
   a linear vibration motor operable to make the piston reciprocate, said linear vibration motor having a stator and a mover, and said mover being supported by a spring so as to form a spring vibration system including said mover; and
   a motor driving unit operable to drive said linear vibration motor;
   wherein said motor driving unit is a motor driving apparatus as defined in claim 9.

21. A refrigerator provided with a compressor which has a cylinder and a piston, said compressor being operable to compress a fluid in the cylinder by a reciprocating motion of the piston, said refrigerator comprising:
   a linear vibration motor operable to make the piston reciprocate, said linear vibration motor having a stator and a mover, and said mover being supported by a spring so as to form a spring vibration system including said mover; and
   a motor driving unit operable to drive said linear vibration motor;
   wherein said motor driving unit is a motor driving apparatus as defined in claim 9.

22. A cryogenic freezer provided with a compressor which has a cylinder and a piston, said compressor being operable to compress a fluid in the cylinder by a reciprocating motion of the piston, said cryogenic freezer comprising:
   a linear vibration motor operable to make the piston reciprocate, said linear vibration motor having a stator and a mover, and said mover being supported by a spring so as to form a spring vibration system including said mover; and
   a motor driving unit operable to drive said linear vibration motor;
   wherein said motor driving unit is a motor driving apparatus as defined in claim 9.

23. A hot-water supply unit provided with a compressor which has a cylinder and a piston, said compressor being operable to compress a fluid in the cylinder by a reciprocating motion of the piston, said hot-water supply unit comprising:
   a linear vibration motor operable to make the piston reciprocate, said linear vibration motor having a stator and a mover, and said mover being supported by a spring so as to form a spring vibration system including said mover; and
   a motor driving unit operable to drive said linear vibration motor;
   wherein said motor driving unit is a motor driving apparatus as defined in claim 9.

24. A handy phone comprising:
   a linear vibration motor operable to generate vibration, said linear vibration motor having a stator and a mover, which is supported by a spring so as to form a spring vibration system including said mover; and
   a motor driving unit operable to drive said linear vibration motor;
   wherein said motor driving unit is a motor driving apparatus as defined in claim 9.

25. A motor driving apparatus as defined in claim 9, wherein the operation condition of the linear vibration motor is at least one of a position of the mover, a target voltage value of the linear vibration motor, and an actual voltage value of the driving voltage of the linear vibration motor.

* * * * *

UNITED STATES PATENT AND TRADEMARK OFFICE
CERTIFICATE OF CORRECTION

PATENT NO. : 6,977,474 B2
APPLICATION NO. : 10/483720
DATED : December 20, 2005
INVENTOR(S) : Mitsuo Ueda et al.

It is certified that error appears in the above-identified patent and that said Letters Patent is hereby corrected as shown below:

In column 46, line 24, please delete "the basis of" after "on" and before "the".

In column 47, line 2, please add --a-- after "and" and before "stroke".

In column 47, line 8, please add --said-- after "by" and before "driving".

Signed and Sealed this

Eleventh Day of July, 2006

JON W. DUDAS
*Director of the United States Patent and Trademark Office*